(12) United States Patent
Kim et al.

(10) Patent No.: US 9,480,072 B2
(45) Date of Patent: Oct. 25, 2016

(54) APPARATUS AND METHOD FOR TRANSMISSION/RECEPTION IN RADIO COMMUNICATION SYSTEM

(71) Applicant: Samsung Electronics Co., Ltd, Gyeonggi-do (KR)

(72) Inventors: Tae-Young Kim, Gyeonggi-do (KR); Ji-Yun Seol, Gyeonggi-do (KR); Hyun-Kyu Yu, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 149 days.

(21) Appl. No.: 14/166,734

(22) Filed: Jan. 28, 2014

(65) Prior Publication Data

US 2015/0289281 A1   Oct. 8, 2015

(30) Foreign Application Priority Data

Jan. 28, 2013   (KR) ........................ 10-2013-0009021

(51) Int. Cl.
*H04B 7/02*   (2006.01)
*H04W 72/08*   (2009.01)
(Continued)

(52) U.S. Cl.
CPC ......... *H04W 72/085* (2013.01); *H04B 7/0617* (2013.01); *H04B 7/0619* (2013.01);
(Continued)

(58) Field of Classification Search
CPC .................................................. H04L 27/2601
USPC ......................................................... 375/267
See application file for complete search history.

(56) References Cited

U.S. PATENT DOCUMENTS

2005/0243940 A1* 11/2005 Huh ..................... H04L 25/022
                                                                    375/260
2009/0002235 A1    1/2009 Ito
(Continued)

FOREIGN PATENT DOCUMENTS

EP          2466836 A2    6/2012
KR      20070106632 A    11/2007
(Continued)

OTHER PUBLICATIONS

International Search Report dated May 19, 2014 in connection with International Patent Application No. PCT/KR2014/000824, 3 pages.
(Continued)

*Primary Examiner* — Lihong Yu

(57) ABSTRACT

A transmitter, a receiver, and a method for measuring a radio channel based on reference signals transmitted through a predetermined number of OFDM symbols by using multiple antennas in an ultra-high frequency band, and controlling a beam width of analog beams formed by transmission multiple antennas based on the measurement result. The transmitter uniquely distributes a predetermined number of analog beams among the analog beams formed by the array antenna in correspondence to each of the predetermined number of OFDM symbols, and repeatedly allocates the predetermined number of analog beams distributed for each of the predetermined number of OFDM symbols by targeting the subcarriers within the corresponding OFDM symbol. The receiver receives a channel measurement instruction message, measures a channel state based on reference signals transmitted through the analog beams allocated for respective subcarriers, and feeds the channel state measurement result back to the transmitter.

30 Claims, 11 Drawing Sheets

(51) Int. Cl.
   *H04L 5/00*     (2006.01)
   *H04L 25/02*    (2006.01)
   *H04B 7/06*     (2006.01)
   *H04L 27/26*    (2006.01)

(52) U.S. Cl.
   CPC ........... *H04L5/0023* (2013.01); *H04L 5/0048* (2013.01); *H04L 25/0224* (2013.01); *H04L 25/0228* (2013.01); *H04L 27/2601* (2013.01)

(56) References Cited

U.S. PATENT DOCUMENTS

| | | |
|---|---|---|
| 2009/0190520 A1 | 7/2009 | Hochwald et al. |
| 2009/0225722 A1* | 9/2009 | Cudak ................... H04L 5/0007 370/330 |
| 2011/0255434 A1* | 10/2011 | Ylitalo ................... H01Q 1/246 370/252 |
| 2013/0034177 A1 | 2/2013 | Lee et al. |

FOREIGN PATENT DOCUMENTS

| | | |
|---|---|---|
| KR | 20110057893 A | 6/2011 |
| WO | WO 2007/149722 A1 | 12/2007 |

OTHER PUBLICATIONS

Written Opinion of the International Searching Authority dated May 19, 2014 in connection with International Patent Application No. PCT/KR2014/000824, 9 pages.

* cited by examiner

APPARATUS AND METHOD FOR TRANSMISSION/RECEPTION IN RADIO COMMUNICATION SYSTEM

CROSS-REFERENCE TO RELATED APPLICATION(S) AND CLAIM OF PRIORITY

The present application is related to and claims the priority under 35 U.S.C. §119(a) to Korean Application Serial No. 10-2013-0009021, which was filed in the Korean Intellectual Property Office on Jan. 28, 2013, the entire content of which is hereby incorporated by reference.

TECHNICAL FIELD

The present disclosure relates to a transmitter for transmitting reference signals and a method for the same and a receiver for reporting channel measurement results by the reference signals and a method for the same in an ultra-high frequency band radio communication system.

BACKGROUND

Diversification and a high penetration rate of radio communication devices and an increase in content are factors increasing traffic of a wireless network. Radio communication techniques have progressed in a direction for raising a data transmission rate in order to solve the traffic problems of the wireless network.

The Long Term Evolution (LTE) system is a representative radio communication system commercialized in an attempt to raise the data transmission rate. The LTE system has developed toward improving spectral efficiency in order to increase the data transmission rate. However, there is difficulty in satisfying demands for the wireless data traffic only by improvement of the spectral efficiency.

A way to solve the problem is to use a wide frequency band. However, current radio communication systems using a frequency band of 5 GHz or lower have difficulty in securing the wide frequency band. Thus, it is necessary to secure a wideband frequency in a higher frequency band.

In general, path loss is increased with a transmission frequency raised in the radio communication systems. Distance of arrival for determining radio communication service coverage is reduced due to the increase of the path loss. Beam-forming techniques alleviate the propagation path loss to increase the distance of arrival in the radio communication systems.

Among the beam-forming techniques, a transmission beam-forming technique concentrates signals transmitted from a plurality of antennas to a specific direction. Here, each of the plurality of antennas is called an antenna element. A set of the antenna elements is called an array antenna.

The transmission beam-forming technique can increase the distance of arrival of transmitted signals. The transmission beam-forming technique may also transmit signals only in a desired direction. The transmission beam-forming technique prevents signals from being transmitted in a direction other than the desired direction. This can reduce interference in the wireless network.

A reception beam-forming technique using a reception array antenna may be applied to a reception side. The reception beam-forming technique can intensively receive a radio wave introduced from a specific direction. This can increase a receiving sensitivity. In addition, the reception beam-forming technique can regard signals introduced from a direction other than a desired direction as interference to interrupt the signals.

In general, a radio signal has a short wavelength with a raised use frequency. Accordingly, in a case of configuring antennas at a half wavelength interval, an array antenna having more antenna elements in the same area may be configured to use a high frequency.

The beam-forming technique may obtain a relatively higher antenna gain in a high frequency band as compared with a low frequency band. Accordingly, it is advantageous to apply the beam-forming technique to a radio communication system using an ultra-high frequency.

However, a new beam-forming technique is needed to obtain the high data transmission rate in the multiple antenna system, together with the application of the analog beam-forming technique for acquisition of the high antenna gain.

SUMMARY

To address the above-discussed deficiencies, it is a primary object to provide a transmitter that transmits reference signals for channel measurement through a predetermined number of Orthogonal Frequency Division Multiplexing (OFDM) symbols in an ultra-high frequency band radio communication system, and a method for the same.

Another aspect of the present disclosure is to provide a receiver that reports the channel measurement results to the transmitter to control a beam width of analog beams by an array antenna of the transmitter in the ultra-high frequency band radio communication system, and a method for the same.

Another aspect of the present disclosure is to provide a channel measurement procedure individually performed according to various transmission methods by using a downlink midamble in the ultra-high frequency band radio communication system.

In accordance with one aspect of the present disclosure, a method of transmitting reference signals by using an array antenna configured with a plurality of antenna elements by a transmitter in an ultra-high frequency band radio communication system is provided. The method includes: allocating locations of subcarriers for respective analog beams to transmit the reference signals within a predetermined number of OFDM symbols; and simultaneously transmitting the reference signals through the analog beams corresponding to the subcarriers at at least two contiguous locations on a time axis or a frequency axis among the allocated locations.

In accordance with another aspect of the present disclosure, a method of reporting a channel measurement result by a receiver in an ultra-high frequency band radio communication system is provided. The method includes: receiving reference signals through analog beams corresponding to subcarriers at at least two contiguous locations on a time axis or a frequency axis among locations of the subcarriers allocated for the respective analog beams designated within a predetermined number of OFDM symbols; measuring channels based on the received reference signals; and feeding a result of the channel measurement back to a transmitter.

In accordance with another aspect of the present disclosure, a transmitter for transmitting reference signals by using an array antenna configured with a plurality of antenna elements in an ultra-high frequency band radio communication system is provided. The transmitter includes: a resource allocating unit that allocates locations of subcarriers for respective analog beams to transmit the reference signals within a predetermined number of OFDM symbols; and a transmission unit that simultaneously transmits the reference signals through the analog beams corresponding to the subcarriers at at least two contiguous locations on a time axis or a frequency axis among the allocated locations.

In accordance with another aspect of the present disclosure, a receiver for reporting a channel measurement result in an ultra-high frequency band radio communication system is provided. The receiver includes: a reception unit that receives reference signals through analog beams corresponding to subcarriers at at least two contiguous locations on a time axis or a frequency axis among locations of the subcarriers allocated for the respective analog beams designated within a predetermined number of OFDM symbols; a channel measuring unit that measures channels based on the received reference signals; and a transmission unit that feeds a result of the channel measurement back to a transmitter.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
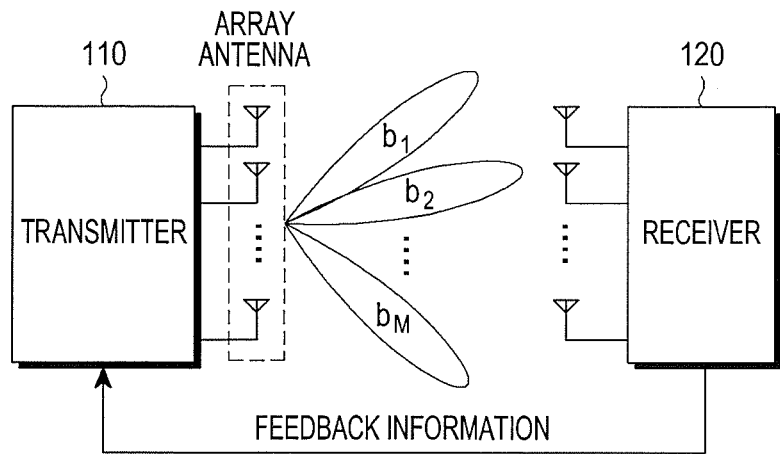
FIG. 1 illustrates a structure of a multiple antenna based ultra-high frequency band radio communication system according to an embodiment of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Hereinafter, the detailed description according to the present disclosure will provide representative embodiments to solve the technical problems. Further, the same names of entities defined for the convenience of descriptions of the present disclosure may be used. However, the names used for the convenience of the descriptions do not limit the scope of the present disclosure, and may be applied to a system having a similar technical background through the same or easy modification.

In an embodiment of the present disclosure which will be described below, a method and a structure are proposed for transmitting reference signals for measurement of a channel state in an ultra-high frequency band based radio communication system using analog beam-forming and a pre-coder in a baseband.

Further, a channel measurement procedure is proposed which is individually performed by a receiver in correspondence to various transmission methods of reference signals. For example, the various transmission methods include a wideband transmission method and a sub-band transmission method. In the wideband transmission method, resources are allocated to be dispersed in the full band and signals are transmitted using the allocated resources. In the sub-band transmission method, resources are allocated in a specific frequency area and signals are transmitted using the allocated resources.

The various transmission methods may further include a single beam transmission method and a multi-beam transmission method. In the single beam transmission method, signals are transmitted using one analog signal. In the multi-beam transmission method, signals are transmitted using a plurality of analog beams through a selection. In the multi-beam transmission method, the signals may be transmitted through application of a pre-coder in the baseband.

A method and a procedure for measuring a channel state of a downlink from the reference signals according to the embodiments proposed as described above may vary depending on which of the various transmission methods is employed.

Accordingly, the channel measuring method and procedure should be defined in view of the transmission method used for the signal transmission. The reference signal transmitting method and structure for that should also be newly defined.

Besides, in order to measure the channel state based on the reference signals, a transmitter should be prepared to transfer, to a receiver, control information defining the transmission method used to transmit the reference signals.

According to the above description, in the proposed embodiments, beams are formed using the analog beam-forming technique, and signals are transmitted through application of the pre-coder similar to that applied to multiple antennas in the baseband when a plurality of analog beams are formed. This may enhance reliability for received signals. In addition, an increase in system capacity may also be anticipated.

Hereinafter, embodiments of the present disclosure will be specifically described with reference to the accompanying drawings.

FIG. 1 illustrates a structure of a multiple antenna based ultra-high frequency band radio communication system according to an embodiment of the present disclosure. The ultra-high frequency band radio communication system configured with one transmitter 110 and one receiver 120 is illustrated in FIG. 1. However, it will be obvious that the proposed embodiment may also be identically applied to an ultra-high frequency band radio communication system configured with one transmitter and a plurality of receivers.

Referring to FIG. 1, the transmitter 110 transmits signals through an array antenna configured with a plurality of antenna elements. The array antenna transmitting the signals form a plurality of intrinsic analog beams b1, b2, . . . , bM, respectively.

The transmitter 110 transmits reference signals for measurement of a downlink channel state. For example, based on the Orthogonal Frequency Division Multiplexing (OFDM) scheme, the transmitter 110 transmits the reference signals through OFDM symbols at specified locations in a sub-frame. A downlink midamble may be used for the reference signals.

The OFDM symbols through which the reference signals are transmitted may be successively arranged or may be regularly or irregularly dispersed along a time axis in the sub-frame. The OFDM symbol locations in the sub-frame where the reference signals are transmitted should be promised in advance between the transmitter 110 and the receiver 120.

The transmitter 110 transmits the signals by the plurality of antenna elements configuring the array antenna. The transmitter 110 allocates the analog beams formed by the array antenna to subcarriers of the OFDM symbols through which the reference signals will be transmitted. For example, the transmitter 110 determines a location of the subcarriers for transmission of the reference signals using the different analog beams, within the OFDM symbols through which the reference signals will be transmitted. Namely, the transmitter 110 designates the analog beams to the respective subcarriers within an entire frequency band for one OFDM symbol. The transmitter 110 may repeatedly allocate one analog beam to different subcarriers in one OFDM symbol.

The transmitter 110 transmits control information instructing channel measurement based on the reference signals to the receiver 120 through a pre-promised control channel (e.g., a Physical Downlink Control Channel (PDCCH) or a Broadcast Channel (BCH)). For example, the transmitter 110 creates a channel measurement instruction message by the control information instructing the channel measurement, and transmits the created channel measurement instruction message to the receiver 120 through the PDCCH (or the BCH). The control information instructing the channel measurement may include resource allocation identification information, transmission method identification information, beam index bitmap information, and the like.

The resource allocation identification information corresponds to information for designating a frequency band to be used to transmit the reference signals. For example, the resource allocation identification information corresponds to information for designating one of the wideband transmission method by which resources for transmission of the reference signals are dispersed and allocated within the entire frequency band, and the sub-band transmission method by which resources for transmission of the reference signals are allocated within a specific frequency band.

The transmission method identification information corresponds to information on the analog beams to be used to transmit the reference signals. For example, the transmission method identification information corresponds to information for identifying whether the reference signals are transmitted using one analog beam or a plurality of analog beams based on the pre-coder.

The beam index bitmap information corresponds to information for designating the analog beam to be used for the channel measurement among the analog beams formed by the transmitter. For example, the beam index bitmap information is configured with bits corresponding to the number of the analog beams formed by the transmitter. At this time, each of the bits instructs whether the channel measurement is to be performed for each of the analog beams.

The receiver 120 receives the reference signals from the transmitter 110 by using the beam-forming technique. For example, for the channel measurement, the receiver 120 receives the reference signals from the transmitter 110. The receiver 120 may receive the control information instructing the channel measurement from the transmitter 110 if necessary.

For example, the receiver 120 receives the reference signals transmitted through the promised OFDM symbols in view of the resource allocation and the transmission method which are identified by the control information instructing the channel measurement. Namely, the receiver 120 receives the reference signal transmitted through the subcarrier corresponding to an index of the analog beam to be used for the channel measurement within the OFDM symbols promised to transmit the reference signals.

The receiver 120 measures the channel state according to the subcarrier at the location corresponding to the index of the corresponding analog beam, based on the received reference signal. As an example, the receiver 120 acquires Channel Quality Information (CQI) corresponding to the corresponding subcarrier by the channel state measurement. The CQI may be defined as a Carrier to Interference-plus-Noise Ratio (CINR), a Received Signal Strength Indicator (RSSI), or the like.

The receiver 120 configures feedback information based on the acquired CQI. The receiver 120 provides the configured feedback information to the transmitter 110 through an uplink control channel. The feedback information may be configured using a mean value calculated by the acquired CQI. A frequency range for the calculation of the mean value may be determined by the resource allocation and the transmission method according to the control information instructing the channel measurement.

The transmitter 110 performs scheduling for resource allocation or Adaptive Modulation and Coding (AMC), based on the feedback information provided from the receiver 120. The transmitter 110 controls a beam width of the analog beams formed by the array antenna by using the feedback information. Particularly, the transmitter 110 may assign the analog beams to transmit the reference signals in view of the received feed-back information. The transmitter 110 may assign the analog beams for the respective subcarriers in the OFDM symbols.

Figure 2:
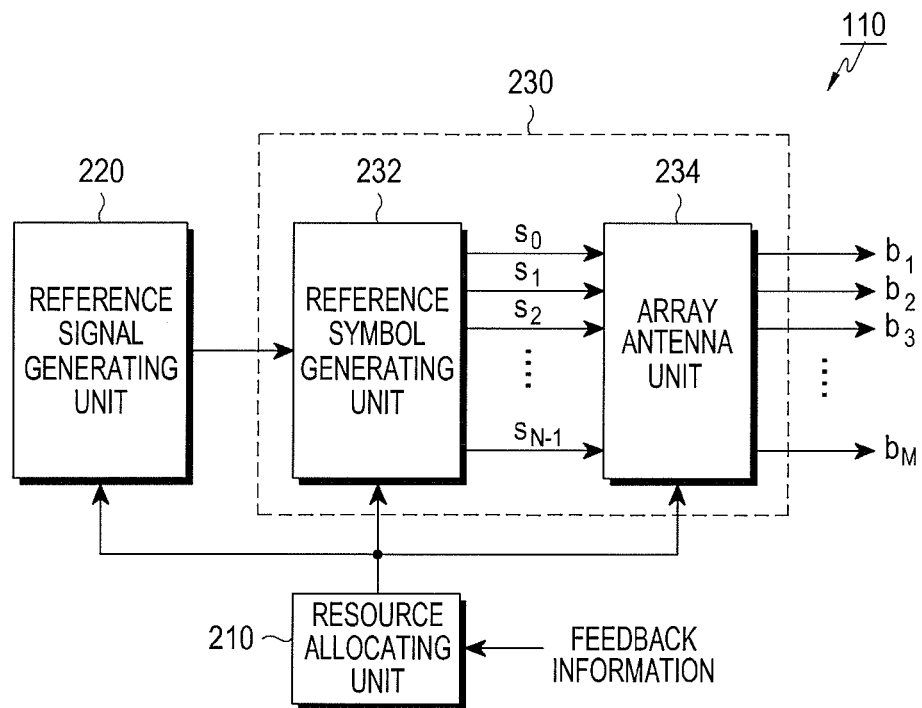
FIG. 2 illustrates a structure of a transmitter of a multiple antenna based ultra-high frequency band radio communication system according to an embodiment of the present disclosure.

FIG. 2 illustrates a structure of a transmitter of a multiple antenna based ultra-high frequency band radio communication system according to an embodiment of the present disclosure. It should be noted that only configurations of the transmitter for transmitting reference signals are illustrated in FIG. 2 for convenience of description of the proposed embodiment. It is assumed in FIG. 2 that the number of array antennas is identical to the number (M) of radio frequency chains.

Referring to FIG. 2, a reference signal generating unit 220 generates reference signals for channel measurement. The reference signals have a pre-promised value or pattern. The reference signals may be transmitted by a predetermined magnitude of power.

A resource allocating unit 210 allocates a location of subcarriers corresponding to respective analog beams for transmitting the reference signals within a promised number of OFDM symbols. As an example, the resource allocating unit 210 allocates the location of the subcarriers to the respective analog beams in view of a pre-promised rule or feedback information provided from a receiver through channel measurement.

The resource allocating unit 210 uniquely distributes a predetermined number of analog beams among analog beams formed by an array antenna for each of a promised number of OFDM symbols. The resource allocating unit 210 allocates indices representing the location of the subcarriers existing within the corresponding OFDM symbol in correspondence to the respective analog beams distributed for each of the OFDM symbols. Thus, the analog beams distributed for the subcarriers in one OFDM symbol may be repeatedly allocated.

As an example, the location of the subcarriers where the analog beams are distributed may be defined by a symbol index and a subcarrier index. The symbol index is granted to each of the OFDM symbols promised to transmit reference signals. The subcarrier index is granted to each of the subcarriers within the OFDM symbol.

Namely, a subcarrier location ($\{t_i[k], sub_i[k]\}$) of a reference signal corresponding to a specific analog beam may be defined by Equation 1 as a high-order function concept.

$$\{t_i[k], sub_i[k]\} = f(n_i | M, L, F, N_{sub}) \quad \text{Equation 1}$$

Here, $t_i[k]$ denotes an OFDM symbol index (0 ... L-1), $sub_i[k]$ denotes a subcarrier index (0 ... $N_{sub}$-1), k denotes $$0 \leq k < \frac{N_{sub}}{MF} = K,$$

$n_i$ denotes an analog beam index, M denotes the number of radio frequency chains, L denotes the number of OFDM symbols for transmission of reference signals, F denotes a frequency reuse factor, and $N_{sub}$ denotes the number of all subcarriers.

The number of radio frequency chains M is determined to be identical to or smaller than the number of antenna elements configuring the array antennas. For reference, the radio frequency chains mean a path for generating the OFDM symbols to be transmitted.

The OFDM symbol index $t_i[k]$ and the subcarrier index $sub_i[k]$ may be defined by Equations below based on the high-order function concept in Equation 1. The OFDM symbol index $t_i[k]$ and the subcarrier index $sub_i[k]$ define a subcarrier location of a reference signal corresponding to an analog beam.

As an example, the OFDM symbol index $t_i[k]$ may be calculated by Equation 2, and the subcarrier index $sub_i[k]$ may be calculated by Equation 3.

$$t_i[k] = \left\lfloor \frac{n_i}{M} \right\rfloor \quad \text{Equation 2}$$

$$sub_i[k] = \\ M \times F \times k + \{M + (-1)^{t_i} \cdot (n_i \bmod M) - (t_i \bmod 2)\} \bmod M \quad \text{Equation 3}$$

Here, k denotes $$0 \leq k < \frac{N_{sub}}{MF} = K,$$

$n_i$ denotes an analog beam index, M denotes the number of radio frequency chains, $\lfloor . \rfloor$ denotes a round-down operation (a floor operation), F denotes a frequency reuse factor, and $N_{sub}$ denotes the number of all subcarriers.

As another example, the OFDM symbol index $t_i[k]$ may be calculated by Equation 4, and the subcarrier index $sub_i[k]$ may be calculated by Equation 5.

$$t_i[k] = \{L + (-1)^{sub_i[k]} \cdot (n_i \bmod L) - (sub_i[k] \bmod 2)\} \bmod L \quad \text{Equation 4}$$

$$sub_i[k] = M \times F \times k + \left\lfloor \frac{n_i}{L} \right\rfloor \quad \text{Equation 5}$$

Here, k denotes $$0 \leq k < \frac{N_{sub}}{MF} = K,$$

$n_i$ denotes an analog beam index, M denotes the number of radio frequency chains, $\lfloor . \rfloor$ denotes a round-down operation (a floor operation), L denotes the number of OFDM symbols for reference signals, F denotes a frequency reuse factor, and $N_{sub}$ denotes the number of all subcarriers.

The resource allocating unit 210 provides the OFDM symbol index $t_i[k]$ and the subcarrier index $sub_i[k]$ to a transmission unit 230.

The transmission unit 230 transmits reference signals through analog beams corresponding to the respective subcarrier locations allocated by the resource allocating unit 210. As an example, the transmission unit 230 simultaneously transmits the reference signals through the analog beams corresponding to at least two contiguous subcarriers on a time axis or a frequency axis among the allocated subcarrier locations.

The transmission unit 230 may include a reference symbol generating unit 232 and an array antenna unit 234.

The reference symbol generating unit 232 generates a predetermined number (N) of reference symbols S0, S1, S2, . . . , SN−1 by coding and modulation, with the reference signals provided by the reference signal generating unit 220 serving as an input. For example, based on the OFDM technique, the number (N) of reference symbols generated by the reference symbol generating unit 232 may be defined as the number of subcarriers configuring one OFDM symbol, namely, the number of resource elements.

The reference symbol generating unit 232 may generate the reference symbols in view of the subcarrier locations provided by the resource allocating unit 210. Namely, the reference symbol generating unit 232 generates a reference symbol to be transmitted for each of subcarrier locations, namely, each of resource elements in a specific OFDM symbol. The specific OFDM symbol corresponds to an OFDM symbol promised to transmit reference signals.

The array antenna unit 234 outputs the reference symbols S0, S0, S2, . . . , SN−1 generated by the reference symbol generating unit 232 such that the reference symbols may be transmitted through designated analog beams. The analog beams are designated for the respective subcarriers of the corresponding OFDM symbol by the resource allocating unit 210. Namely, the array antenna unit 234 outputs the reference symbols S0, S1, S2, . . . , SN−1 for the respective allocated analog beams.

The transmitter 110 may further include a configuration for transmitting control information for channel measurement to the receiver through a control channel, although the configuration is not illustrated in FIG. 2. The control information may correspond to control information required for measuring channel situations for the respective analog beams based on the reference signals.

As an example, the transmission unit 230 may further include a configuration for configuring a channel measurement instruction message and transmitting the configured channel measurement instruction message to the receiver. The channel measurement instruction message may include resource allocation identification information, transmission method identification information, and beam index bitmap information.

Figure 3:
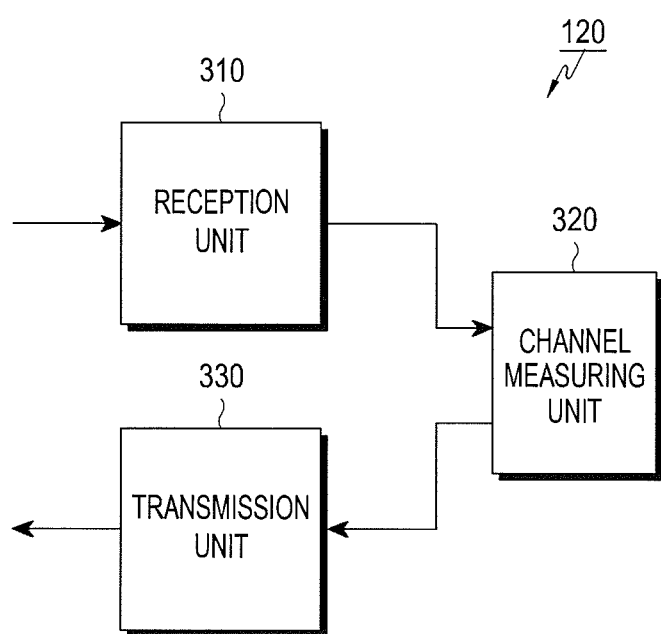
FIG. 3 illustrates a structure of a receiver of a multiple antenna based ultra-high frequency band radio communication system according to an embodiment of the present disclosure.

FIG. 3 illustrates a structure of a receiver of a multiple antenna based ultra-high frequency band radio communication system according to an embodiment of the present disclosure. It should be noted that only configurations of the receiver for measuring a channel based on the reference signals and reporting the measurement result to the transmitter are illustrated in FIG. 3 for convenience of description of the proposed embodiment.

Referring to FIG. 3, a reception unit 310 receives signals transmitted by the transmitter. The reception unit 310 outputs the received signals through demodulation and decoding of the received signals. For example, the reception unit 310 receives a channel measurement instruction message though a control channel, and outputs control information included in the channel measurement instruction message.

The reception unit 310 receives the reference signals transmitted by a predetermined number of OFDM symbols through analog beams formed by an array antenna provided to the receiver. For example, the reception unit 310 receives reference signals corresponding to specific analog beams according to the control information included in the channel measurement instruction message among the analog beams formed by the transmitter.

In order to receive the reference signals, the reception unit 310 may identify a resource allocation method and a transmission method, which have been used in the transmitter, based on the control information included in the channel measurement instruction message.

A channel measuring unit 320 measures a channel state for the corresponding analog beam based on the reference signal received by the reception unit 310, and calculates channel quality information (e.g., CQI) of the corresponding analog beam by the measurement result.

For example, the channel measuring unit 320 identifies an index of the analog beam subject to channel measurement by beam index bitmap information included in the channel measurement instruction message. The channel measuring unit 320 detects a reference signal at a location of a specific subcarrier of a predetermined number of OFDM symbols received through the reception unit 310. The channel measuring unit 320 may acquire the location of the specific subcarrier by an index of the previously identified analog beam. The channel measuring unit 320 measures a channel state for the corresponding analog beam by using the detected reference signal. The channel measuring unit 320 identifies a frequency band and a measurement method for measurement of the channel state by the resource allocation identification information and transmission method identification information included in the channel measurement instruction message.

As an example, the channel measuring unit 320 performs channel measurement targeted at an entire frequency band or a specific frequency band on the basis of the identified resource allocation identification information and the identified transmission method identification information, and estimates a channel quality by a mean value of the measurement result values.

As another example, the channel measuring unit 320 performs channel measurement targeted at an entire frequency band or a specific frequency band on the basis of the identified resource allocation identification information and the identified transmission method identification information, and estimates a code-book index having the highest correlation with a channel vector obtained by the channel measurement. The channel measuring unit 320 estimates a downlink channel quality by an average channel quality in the entire frequency band or the specific frequency band when applying a pre-coder corresponding to the estimated code-book index.

An operation according to a specific example will be described below for measuring the channel state through the resource allocation identification information and the transmission method identification information by the receiver.

A transmission unit 330 feeds the channel measurement result in the channel measuring unit 320 back to the transmitter through a control channel.

In general, an array antenna configured with a plurality of antenna elements is indispensably used to solve a propagation path loss occurring in a radio channel when an ultra-high frequency band is used. The reason is because a beam can be formed in a desired direction when the array antenna is used. Namely, when an identical signal is transmitted through a plurality of antenna elements, beams formed through the array antenna can be rotated in a desired direction by changing a phase of a signal to transmit through each of the antenna elements in view of the transmission direction and a location of the antenna element.

Figure 4:
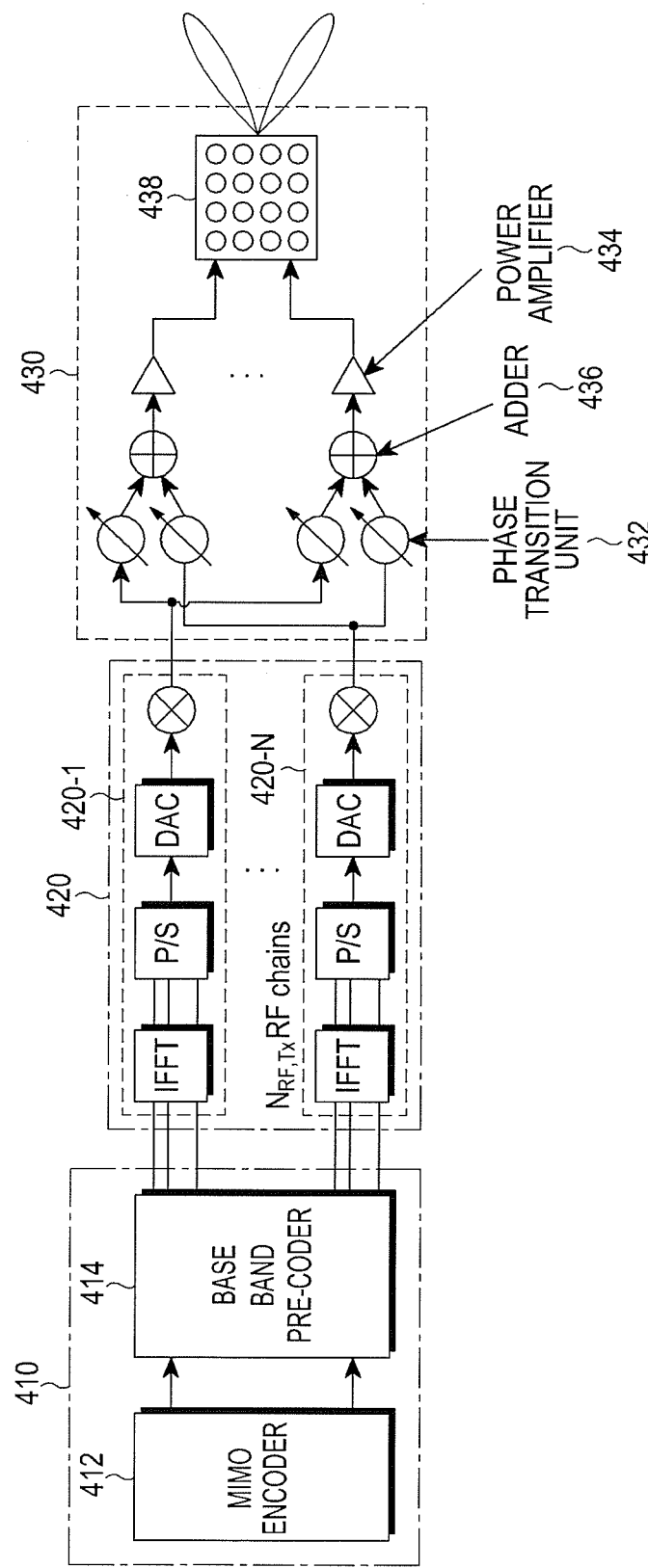
FIG. 4 illustrates a specific configuration example of a transmitter according to an embodiment of the present disclosure.

FIG. 4 illustrates a specific configuration example of a transmitter according to an embodiment of the present disclosure. Namely, FIG. 4 illustrates an example of the transmitter in which beams of an array antenna can be adjusted in a desired direction.

Referring to FIG. 4, a signal generating unit 410 generates a transmission signal. The signal generating unit 410 includes a Multi-Input Multi-Output (MIMO) encoder 412 and a base band pre-coder 414. The MIMO encoder 412 outputs a signal suitable for application of a multiple antenna transmission technique using a plurality of array antennas. The base band pre-coder 414 selects a code-book used for pre-coding based on feedback information from a receiver. The base band pre-coder 414 performs pre-coding for a signal encoded by using the selected code-book. An order of the pre-coding is NRF,Tx. The NRF,Tx is the number of analog beams formed by the array antennas.

The signal on which the pre-coding is performed is output to a radio frequency chain unit 420.

The radio frequency chain unit 420 includes a plurality of radio frequency chains 420-1 to 420-N. For example, the number of radio frequency chains included in the radio frequency chain unit 420 is at least larger than or equal to the NRF,Tx.

Each of the radio frequency chains 420-1 to 420-N includes an Inverse Fast Fourier Transform (IFFT) unit, a Parallel/Serial (P/S) converting unit, a Digital/Analog Converting (DAC) unit, and a mixer.

The IFFT unit transforms the signals in a frequency domain on which the pre-coding is performed into signals in a time domain. The P/S unit converts the signals in the time domain output from the IFFT unit into one serial signal. The DAC unit converts a signal train in a digital type output by the P/S unit into a signal train in an analog type.

A radio frequency beam forming unit 430 includes a plurality of radio frequency beam formers. For example, the number of radio frequency beam formers included in the radio frequency beam forming unit 420 is NRF,Tx.

Thus, the radio frequency chains included in the radio frequency chain unit 420 and the radio frequency beam formers included in the radio frequency beam forming unit 430 may be connected in a one-to-one relationship. Namely, one radio frequency beam former is independently connected to one radio frequency chain.

Each of the radio frequency beam formers includes as many phase transition units 432 as antenna elements configuring an array antenna. In addition, the radio frequency beam former includes as many adders 436 and power amplifiers 434 as the radio frequency beam formers. Each of the phase transition units 432 adjusts a phase of an input signal to control a direction of the corresponding analog beam. The signals output from the respective phase transition units 432 and having the adjusted phase are added by the corresponding adder 436 and output as one signal. The signal output by the adder 436 through the addition is power-amplified by the corresponding power amplifier 434.

In general, multiple channels should be formed to obtain an effect of increasing system capacity through various MIMO transmission techniques in a multiple antenna system. To this end, the transmitter supporting radio communication in an ultra-high frequency band forms a plurality of analog beams by using a plurality of radio frequency chains and independent radio frequency beam formers. For example, the transmitter is configured with an NRF,Tx number of radio frequency chains and radio frequency beam formers. Accordingly, up to NRF,Tx number of different analog beams may be formed.

Figure 5:
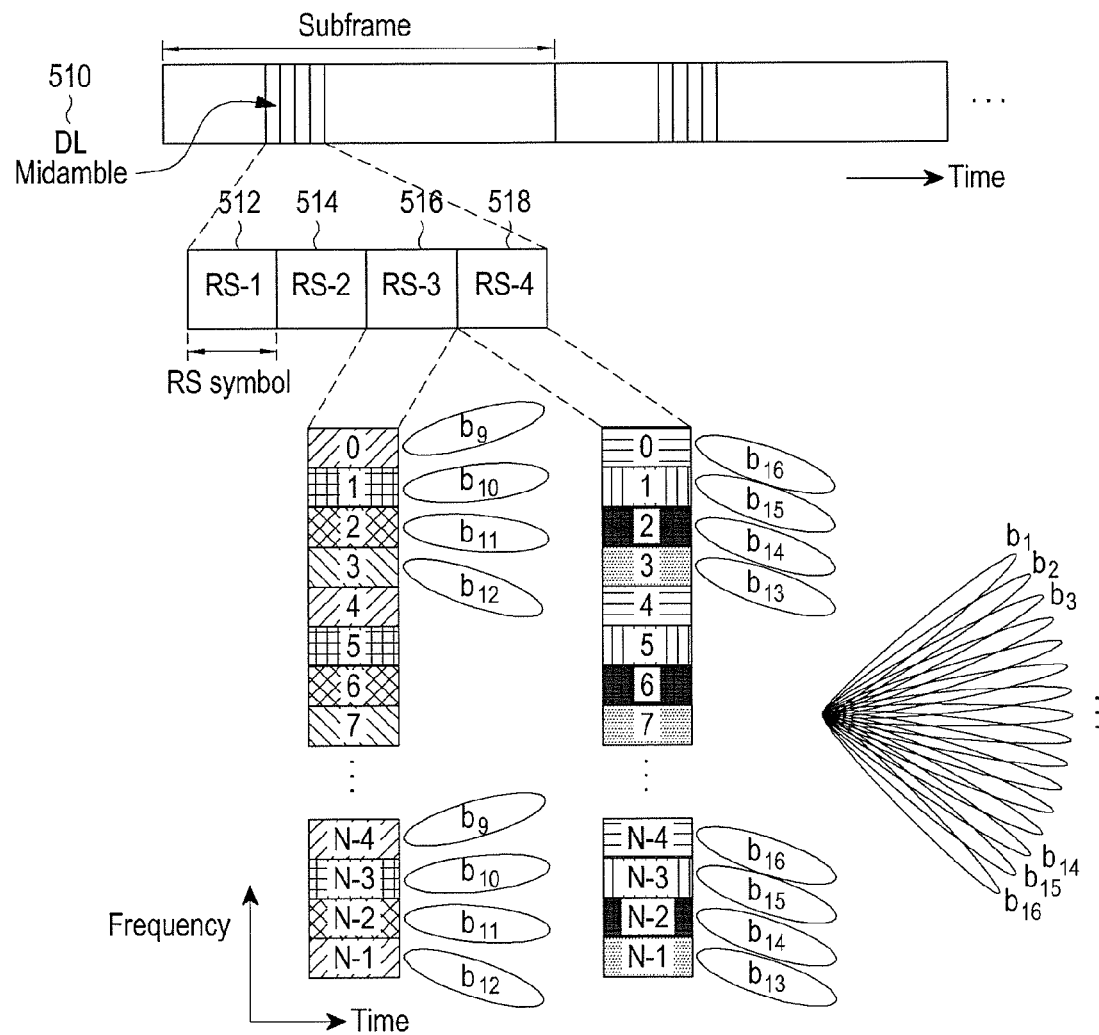
FIG. 5 illustrates an example of transmitting a reference signal for each of beam-formed analog beams in a transmitter according to an embodiment of the present disclosure.

FIG. 5 illustrates an example of transmitting a reference signal for each of beam-formed analog beams in a transmitter according to an embodiment of the present disclosure.

Referring to FIG. 5, the transmitter transmits reference signals through all analog beams corresponding to pre-promised subcarrier locations by utilizing orthogonal resources. The reference signals are promised in advance between the transmitter and the receiver for a report of Channel State Information (CSI) through measurement of a channel state of all the analog beams.

Different subcarriers within an OFDM symbol which are mutually orthogonal on a time axis and a frequency axis may be exemplified as an example of the orthogonal resources. However, the number of analog beams which the transmitter can transmit for an identical time interval is restricted by the number of provided radio frequency chains. Thus, the transmitter allocates the subcarriers for the respective analog beams in view of the number of the provided radio frequency chains.

For example, it may be assumed that the transmitter transmits signals based on a radio frame configured by a predetermined number of sub-frames (e.g., ten sub-frames). The sub-frames are arranged in sequence on a time axis within the frame.

One sub-frame is a unit for transmission of a plurality of OFDM symbols. The OFDM symbols are OFDM symbols corresponding to data or a control signal, or OFDM symbols corresponding to reference signals. As an example, the reference signals (DL-midamble 510) for channel measurement are transmitted through some OFDM symbols RS-1 512, RS-2 514, RS-3 516, and RS-4 518 among a plurality of OFDM symbols configuring the sub-frame and the data or the control signal is transmitted through the remaining OFDM symbols.

One OFDM symbol includes a predetermined number (N) of Resource Elements (REs). The resource elements are arranged in sequence on a frequency axis within the OFDM symbol. As an example, the respective resource elements are allocated to subcarriers on the frequency axis of the OFDM symbol. Accordingly, the transmitter may allocate the analog beams for the respective resource elements.

For example, it is assumed that there are four radio frequency chains provided to the transmitter and sixteen analog beams. Here, the sixteen analog beams are denoted by b1 to b16.

According to the assumption, since there are four radio frequency chains, four analog beams may be allocated to different subcarriers in one OFDM symbol. Accordingly, since it is assumed that the total number of analog beams is sixteen, four OFDM symbols RS-1 512, RS-2 514, RS-3 516, and RS-4 518 existing on the time axis are required for transmitting reference signals through all the analog beams. In this case, the sixteen analog beams are distributed among the four OFDM symbols RS-1 512, RS-2 514, RS-3 516, and RS-4 518 by four analog beams.

Accordingly, the four analog beams distributed to each of the OFDM symbols are allocated to subcarriers within the corresponding OFDM symbol in a one-to-one correspondence.

For example, in a duration corresponding to the third OFDM symbol RS-3 516, a ninth analog beam b9 is allocated to a location of a first subcarrier (subcarrier 0), a tenth analog beam b10 is allocated to a location of a second subcarrier (subcarrier 1), an eleventh analog beam b11 is allocated to a location of a third subcarrier (subcarrier 2), and a twelfth analog beam b12 is allocated to a location of a fourth subcarrier (subcarrier 3). The ninth to twelfth analog beams b9 to b12 are repeatedly allocated to a location of next subcarriers. When the analog beams are allocated to the location of the subcarriers, respectively, as described above, the analog beams distributed for the entire frequency band in the duration corresponding to one OFDM symbol are repeatedly allocated.

As another example, the thirteenth to sixteenth analog beams b13 to b16 are repeatedly allocated in a duration corresponding to the fourth OFDM symbol RS-4 518. However, in the duration corresponding to the fourth OFDM symbol RS-4 518, the analog beams b13 to b16 are allocated in a reverse order to that in which the analog beams are allocated in the duration corresponding to the third OFDM symbol RS-3 516.

It is assumed in FIG. 5 that the OFDM symbols for transmitting the reference signals are successively located on the time axis within the sub-frame. However, the OFDM symbols for transmitting the reference signals do not necessarily need to be successively located on the time axis of the sub-frame.

Figure 6:
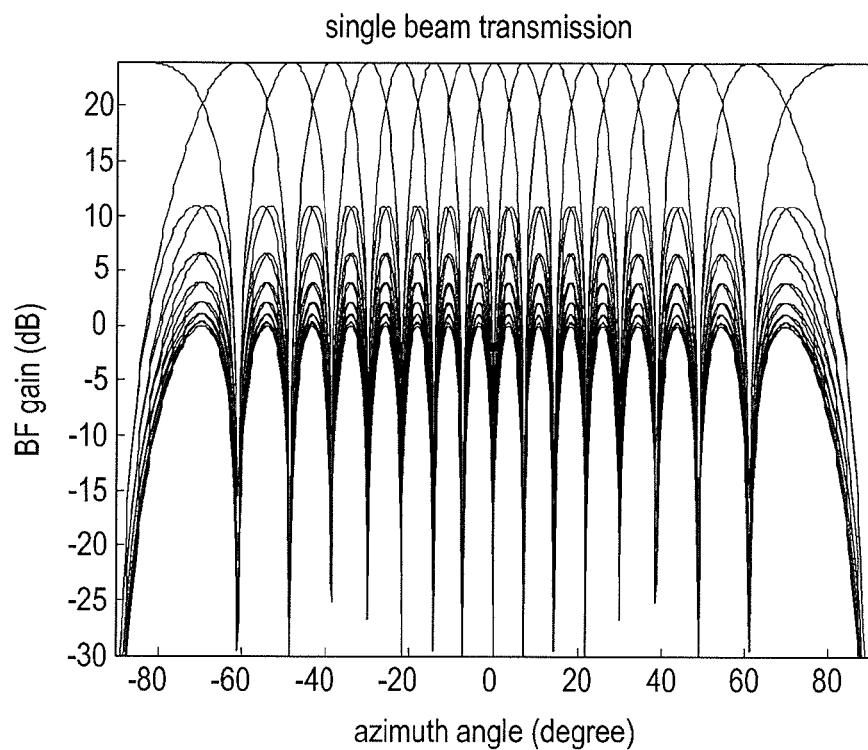
FIG. 6 illustrates analog beam gains (dB) when a single beam is used in an ultra-high frequency band based radio communication system.

FIG. 6 illustrates analog beam gains (dB) when a single-beam is used in an ultra-high frequency band based radio communication system. FIG. 6 is based use of sixteen analog beams having different beam patterns. Namely, it is assumed that the ultra-high frequency band based radio communication system uses an array antenna configured with a total of sixteen antenna elements.

In FIG. 6, the sixteen analog beams are selected based on a criterion which prevents each analog beam from overlapping other analog beams at an azimuth angle having a maximum beam gain. The selection of the analog beams based on such a criterion can be utilized in forming an analog beam having a larger beam width.

Figure 7:
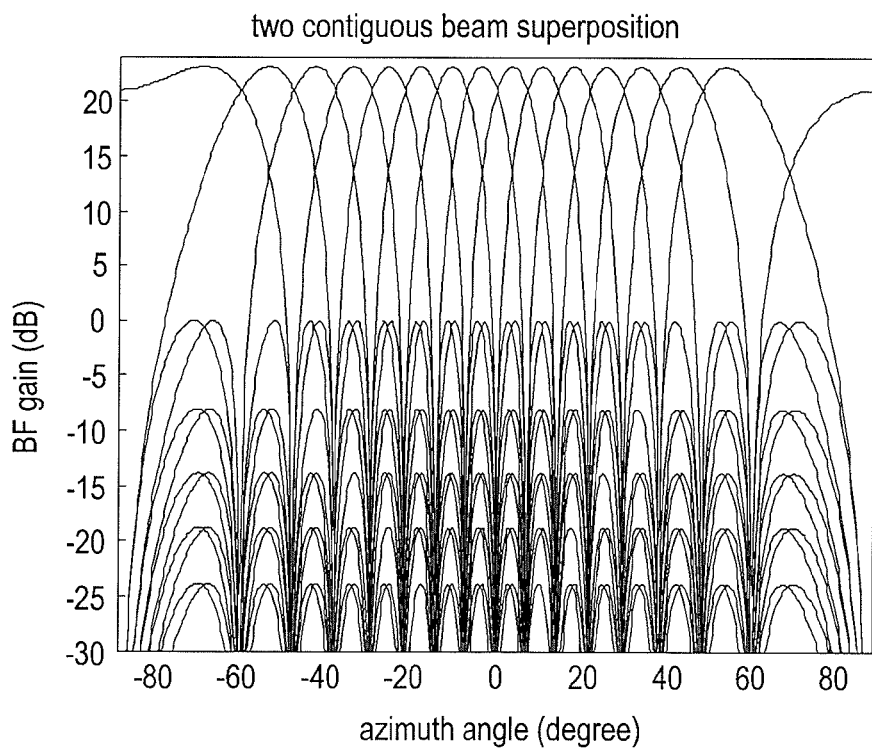
FIG. 7 illustrates analog beam gains (dB) when analog beams are used as a multi-beam in an ultra-high frequency band based radio communication system.

FIG. 7 illustrates analog beam gains (dB) when analog beams are used as a multi-beam in an ultra-high frequency band based radio communication system. FIG. 7 is based on an example in which two contiguous beams are superposed on each other into a multi-beam. Namely, FIG. 7 illustrates an example in which an analog beam having a larger beam width is formed by simultaneously transmitting two contiguous beams among the selected sixteen analog beams.

In FIG. 7, the two contiguous beams among the sixteen analog beams are simultaneously transmitted so that a new analog beam is formed to have a larger beam width. However, two or more beams may be simultaneously transmitted. Namely, an analog beam having a larger beam width can be easily formed by increasing the number of simultaneously transmitted beams to two or more.

However, the number of the simultaneously transmitted beams is restricted by the number of radio frequency chains so that there is a limit in widening the beam width of the analog beams.

For example, when there are four radio frequency chains, a transmitter may simultaneously transmit up to four analog beams. Accordingly, in the transmitter, a beam width formed when the four analog beams are simultaneously transmitted may be a maximum supportable beam width.

The total number of analog beams illustrated in FIG. 7 is fifteen. This is because new analog beams having a larger beam width are formed by simultaneously transmitting the two contiguous beams among the sixteen analog beams.

If it is desired to minimize a beam gain change between newly formed analog beams, the analog beams are preferably formed according to all combinations of two contiguous beams. When characteristics of the selected analog beams are used, the analog beam having a beam width suitable for channel situations and conditions can be used during data transmission. To this end, the receiver needs to measure and report CSI for the corresponding analog beam according to an instruction transferred from the transmitter. In order to support the CSI measurement and report of the receiver, the transmitter should prepare a method and a structure for transmitting a reference signal, for example, a downlink midamble.

Figure 8:
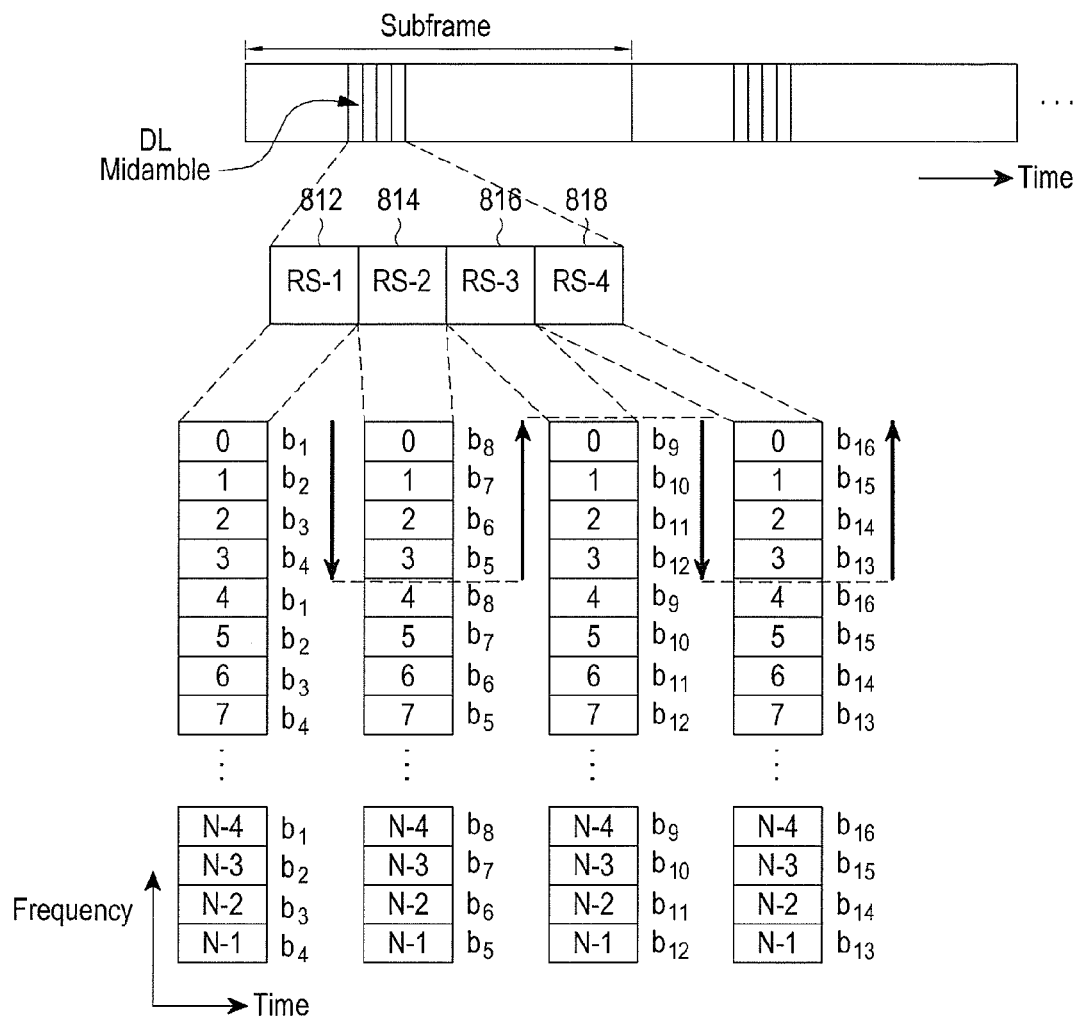
FIG. 8 illustrates an example of allocating analog beams for respective resource elements of OFDM symbols for transmission of reference signals in a transmitter according to an embodiment of the present disclosure.

FIG. 8 illustrates an example of allocating analog beams for respective resource elements of OFDM symbols for transmission of reference signals in a transmitter according to an embodiment of the present disclosure.

Referring to FIG. 8, one sub-frame includes a plurality of OFDM symbols successively arranged on a time axis. Some OFDM symbols (RS-1, RS-2, RS-3, and RS-4) 812, 814, 816, and 818 (hereinafter, referred to as 'reference OFDM symbol") among the plurality of OFDM symbols are used to transmit reference signals.

Each of the reference OFDM symbols includes an N number of resource elements. When an entire frequency band is divided into a plurality of subcarriers in the corresponding reference OFDM symbol, the resource elements mean the divided subcarriers.

One analog beam is allocated to one resource element. Namely, an analog beam to transmit a reference signal by using a subcarrier of the corresponding resource element is allocated to each of the resource elements. The analog beams are allocated in view of the number of reference OFDM symbols and the number of all the analog beams. The number of reference OFDM symbols and the number of all the analog beams are closely related with the number of radio frequency chains included within a transmitter. Namely, it is desirable that the number of analog beams allocated to one reference OFDM symbol coincides with the number of radio frequency chains included within the transmitter.

It is assumed in FIG. 8 that there are four radio frequency chains and sixteen analog beams. Accordingly, the sixteen analog beams are grouped into four analog beam groups. The four analog beam groups are distributed to the four reference OFDM symbols (RS-1, RS-2, RS-3, and RS-4) 812, 814, 816, and 818 in a one-to-one correspondence. As an example, an analog beam group configured with analog beams b1, b2, b3, and b4 is distributed to the first reference OFDM symbol (RS-1) 812, an analog beam group configured with analog beams b5, b6, b7, and b8 is distributed to the second reference OFDM symbol (RS-2) 814, an analog beam group configured with analog beams b9, b10, b11, and b12 is distributed to the third reference OFDM symbol (RS-3) 816, and an analog beam group configured with analog beams b12, b13, b14, and b15 is distributed to the fourth reference OFDM symbol (RS-4) 818.

The analog beams distributed to each of the reference OFDM symbols are allocated to respective subcarriers within the corresponding reference OFDM symbol. For example, the analog beams are allocated to the subcarriers adjacent to each other on a frequency axis or a time axis within the reference OFDM symbol.

For example, in FIG. 8, locations of subcarriers to transmit a reference signal by using the analog beams b1 and b2, respectively, are allocated to be adjacent to each other on the frequency axis. Similarly, the analog beams b3 and b4 are also allocated to subcarriers at adjacent locations on the frequency axis. However, the analog beams b4 and b5 are allocated to subcarriers of which locations are adjacent on a time axis and identical on the frequency axis.

The allocation of the analog beams targeted on the four reference OFDM symbols according to the above description is performed in a direction of arrows illustrated in FIG. 8. Namely, the analog beams b1, b2, b3, and b4 are sequentially allocated to resource elements (subcarriers) having subcarrier indices of 0 to 3 within the reference OFDM symbol (RS-1) having a symbol index of 1. The analog beams b5, b6, b7, and b8 are reversely allocated to resource elements (subcarriers) having subcarrier indices of 0 to 3 within the reference OFDM symbol (RS-2) having a symbol index of 2. The analog beams b9, b10, b11, and b12 are sequentially allocated to resource elements (subcarriers) having subcarrier indices of 0 to 3 within the reference OFDM symbol (RS-3) having a symbol index of 3. The analog beams b13, b14, b15, and b16 are reversely allocated to resource elements (subcarriers) having subcarrier indices of 0 to 3 within the reference OFDM symbol (RS-4) having a symbol index of 4.

Due to the allocation of the analog beams as described above, reference signals are to be transmitted in an order of analog beams b1, b2, . . . , b16 through the subcarriers changed as the time axis (symbol index) and the frequency axis (subcarrier index).

The distributed analog beams are repeatedly allocated to the remaining resource elements other than the resource elements to which the analog beams are allocated, among the entire frequency band in each of the reference OFDM symbols.

For example, the distributed analog beams b1, b2, b3, and b4 are repeatedly allocated to resource elements (subcarriers) corresponding to the remaining subcarrier indices of 4 to N−1 on the frequency axis within the first reference OFDM symbol (RS-1). Namely, the analog beams b1, b2, b3, and b4 are repeatedly allocated in units of resource elements corresponding to four successive subcarrier indices on the frequency axis. The allocation of the analog beams as described above will also be identically applied to the remaining reference OFDM symbols (RS-2, RS-3, and RS-4).

It is assumed in FIG. 8 that the allocation order of analog beams is targeted on the same subcarriers on the time axis (subcarriers having the same subcarrier index). However, the allocation order of analog beams may not necessarily be targeted on the same subcarriers on the time axis. As an example, the allocation order may also be set such that the analog beams are allocated in an order of subcarrier index of 0 to 3 in the reference OFDM symbol having the symbol index of 1, and the analog beams are allocated in an order of subcarrier index of N−1 to N−4 in the reference OFDM symbol having the symbol index of 2.

Figure 9:
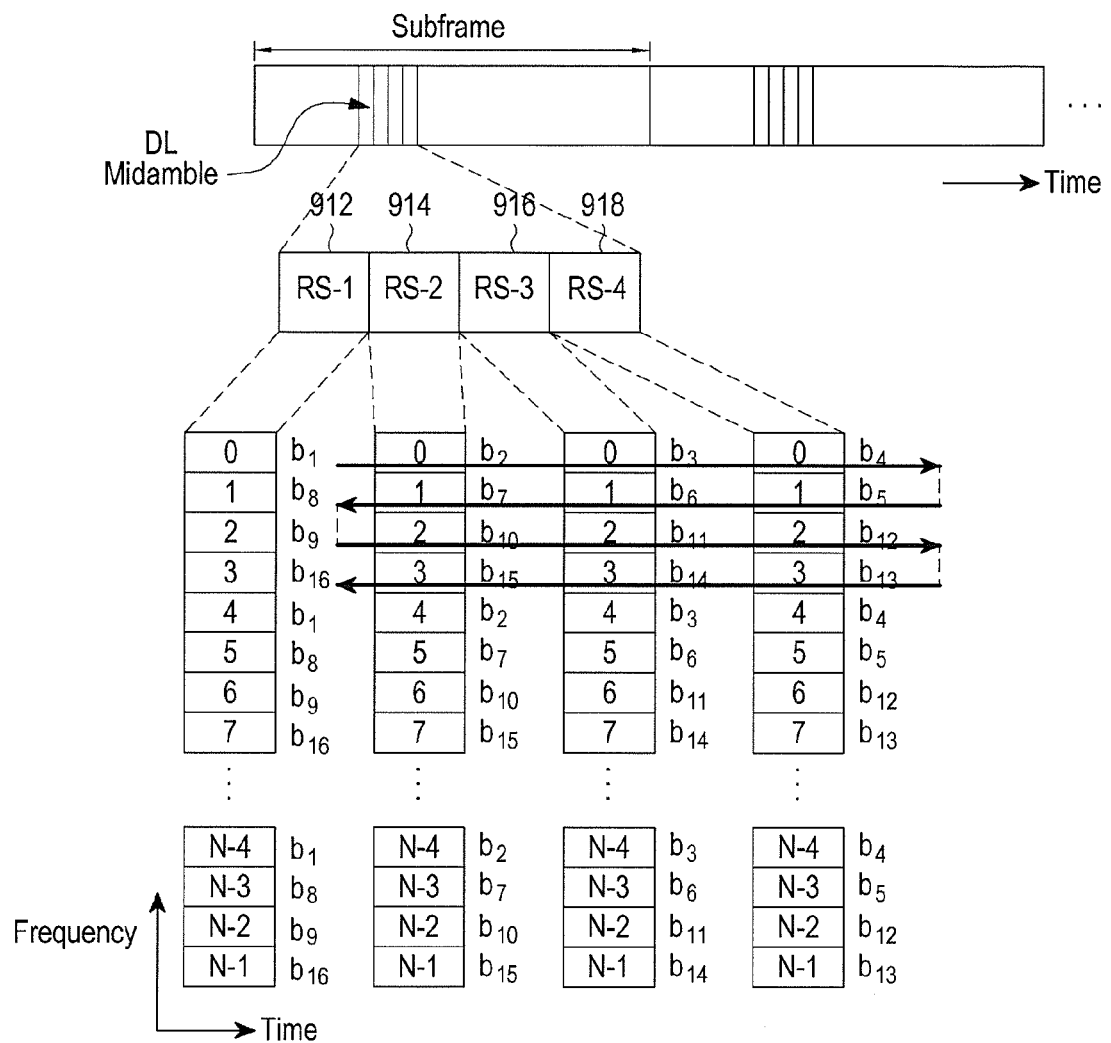
FIG. 9 illustrates another example of allocating analog beams for respective resource elements of OFDM symbols for transmission of reference signals in a transmitter according to an embodiment of the present disclosure.

FIG. 9 illustrates another example of allocating analog beams for respective resource elements of OFDM symbols for transmission of reference signals in a transmitter according to an embodiment of the present disclosure. A physical structure of a sub-frame illustrated in FIG. 9 is the same as that of the sub-frame illustrated in FIG. 8. It is assumed in FIG. 9 that there are four radio frequency chains and sixteen analog beams.

Referring to FIG. 9, the sixteen analog beams are grouped into four analog beam groups. The four analog beam groups are distributed to four reference OFDM symbols (RS-1, RS-2, RS-3, and RS-4) 912, 914, 916, and 918 in a one-to-one correspondence. As an example, an analog beam group configured with analog beams b1, b8, b9, and b16 is distributed to the first reference OFDM symbol (RS-1) 912, an analog beam group configured with analog beams b2, b7, b10, and b15 is distributed to the second reference OFDM symbol (RS-2) 914, an analog beam group configured with analog beams b3, b6, b11, and b14 is distributed to the third reference OFDM symbol (RS-3) 916, and an analog beam group configured with analog beams b4, b5, b12, and b13 is distributed to the fourth reference OFDM symbol (RS-4) 918.

The analog beams distributed to each of the reference OFDM symbols are allocated to respective subcarriers within the corresponding reference OFDM symbol. For example, the analog beams are allocated to the subcarriers adjacent to each other on a frequency axis or a time axis within the reference OFDM symbol.

Namely, the analog beams having four successive indices are allocated to subcarriers located on the same time axis (subcarriers having the same subcarrier index) in the four reference OFDM symbols. The analog beams having next four successive indices are allocated to a next subcarrier, on the frequency axis, subsequent to the subcarrier of the reference OFDM symbol to which the analog beam is lastly allocated and three subcarriers located on the same time axis in the remaining three reference OFDM symbols.

The allocation of the analog beams targeted on the four reference OFDM symbols according to the above description is performed in a direction of arrows illustrated in FIG. 9.

For example, the analog beams b1, b2, b3, and b4 are sequentially allocated to resource elements having a subcarrier index of 0 in the four reference OFDM symbols (RS-1 to RS-4) 912, 914, 916, and 918. The analog beams b5, b6, b7, and b8 are reversely allocated to resource elements having a subcarrier index of 1 in the four reference OFDM symbols (RS-1 to RS-4) 912, 914, 916, and 918. The analog beams b9, b10, b11, and b12 are sequentially allocated to resource elements having a subcarrier index of 2 in the four reference OFDM symbols (RS-1 to RS-4) 912, 914, 916, and 918. The analog beams b13, b14, b15, and b16 are reversely allocated to resource elements having a subcarrier index of 3 in the four reference OFDM symbols (RS-1 to RS-4) 912, 914, 916, and 918.

Due to the allocation of the analog beams as described above, reference signals are to be transmitted from the subcarriers changed on the time axis (symbol index) and the frequency axis (subcarrier index) through the analog beams b1, b2, . . . , b16.

The distributed analog beams are repeatedly allocated to the remaining resource elements other than the resource elements to which the analog beams are allocated, among the entire frequency band in each of the reference OFDM symbols. Namely, the sixteen analog beams are repeatedly allocated in units of four subcarrier indices for the respective four reference OFDM symbols (RS-1 to RS-N) 912, 914, 916, and 918.

It is assumed in FIG. 9 that the analog beams are allocated to the subcarriers having the same subcarrier index and then the analog beam is allocated to the next subcarrier, on the frequency axis, subsequent to the subcarrier which the analog beam is allocated in the last reference OFDM symbol. However, it is not always necessary to allocate the analog beam to the subcarrier having the next subcarrier index after allocating the analog beams to the subcarriers having the same subcarrier index. Namely, the allocation order of the analog beams may also be set using a preset pattern of indices.

In FIGS. 8 and 9, the method and the structure are illustrated for transmitting the reference signals such that channel measurement may be performed for the analog beams having various beam widths.

As an example, the analog beams allocated as illustrated in FIGS. 8 and 9 have the narrow beam width as illustrated in FIG. 6. Within the same OFDM symbol duration, the reference signals may be transmitted through different subcarriers by using the analog beams corresponding to the number of radio frequency chains.

Since the locations of the subcarriers are allocated for the respective analog beams as described above, the locations of the subcarriers corresponding to the corresponding analog beams are contiguous to each other when channel measurement is performed for the plurality of simultaneously transmitted contiguous analog beams, so that channels are assumed to be similar to each other. Accordingly, channels by newly formed analog beams may be measured based on the above assumption.

In conclusion, when the proposed method is applied, the channel measurement for the analog beams having various beam widths can be performed, despite the transmission of the reference signals for the analog beams having one beam width, namely, a narrow beam width.

Figure 10:
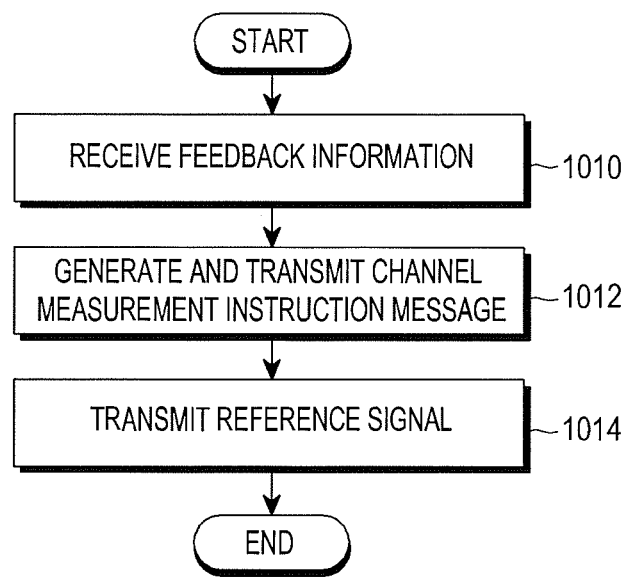
FIG. 10 is a flowchart illustrating a control flow for transmitting reference signals by a transmitter according to an embodiment of the present disclosure.

FIG. 10 is a flowchart illustrating a control flow for transmitting reference signals by a transmitter according to an embodiment of the present disclosure.

Referring to FIG. 10, the transmitter receives feedback information reported from at least one receiver in step 1010. The feedback information includes channel quality identification information according to channel measurement performed based on reference signals previously transmitted by the transmitter.

The transmitter may predict a channel situation for the receiver based on the received feedback information. The transmitter determines a target receiver to which signals will be transmitted and a specific method for transmitting the signals to the target receiver, in view of the predicted channel situation. For example, the specific method for transmitting the signals may correspond to a determination of an optimal encoding rate and an optimal modulation method. The encoding rate and the modulation method are important requisites for determining a transmission rate at which the signals are to be transmitted.

The transmitter controls a beam width of analog beams formed by an array antenna, based on the predicted channel situation. For example, the beam width of the corresponding analog beam may be adjusted through control of amplitude in addition to a phase of a phase control means provided for each of the analog beams. In addition, the beam width may be adjusted through transmitting a plurality of analog beams at the same time point.

The transmitter generates a channel measurement instruction message and transmits the generated channel measurement instruction message to the receiver through a control channel, in step 1012. The channel measurement instruction message includes control information required for channel measurement of the receiver based on reference signals.

As an example, the channel measurement instruction message includes resource allocation identification information, transmission method identification information, and beam index bitmap information. The information included in the channel measurement instruction message has already been defined above.

The transmitter transmits reference signals through analog beams formed by an array antenna in step 1014 after transmitting the channel measurement instruction message. As an example, when transmitting the reference signals by using OFDM symbols, the transmitter allocates the analog beams to transmit the reference signals, to some resource elements configuring the OFDM symbols. The transmitter may transmit the reference signals by using the analog beams allocated to respective subcarrier locations of the OFDM symbols.

Figure 11:
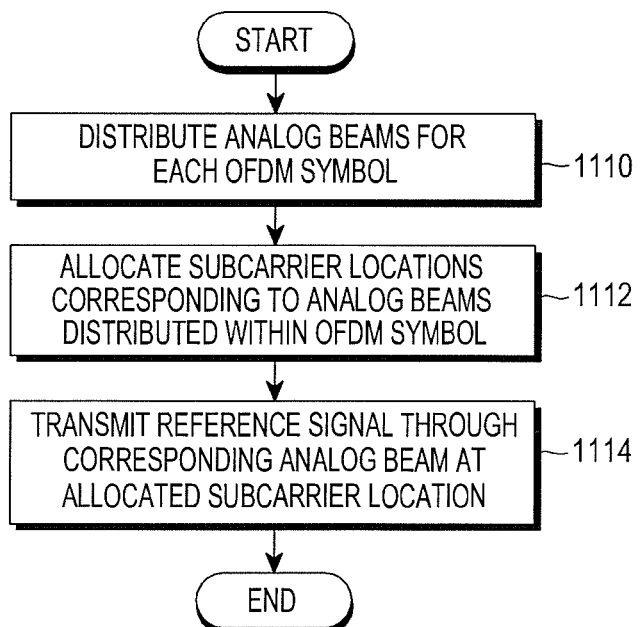
FIG. 11 is a flowchart illustrating a sub-routine to be performed for transmission of reference signals by a transmitter according to an embodiment of the present disclosure.

FIG. 11 is a flowchart illustrating a sub-routine to be performed for transmission of reference signals by a transmitter according to an embodiment of the present disclosure. Here, it is assumed that the transmitter in an ultra-high frequency band based radio communication system transmits the reference signals for channel measurement through a predetermined number of OFDM symbols.

Referring to FIG. 11, the transmitter distributes analog beams for each of reference OHM symbols, in step 1110. The reference OFDM symbols are OFDM symbols promised to transmit reference signals among a plurality of OFDM symbols configuring a sub-frame. For example, the transmitter distributes the analog beams for the reference OFDM symbols in view of the number of reference OFDM symbols within the sub-frame, the number of radio frequency chains, the number of analog beams, and the like. As an example, when reference signals are transmitted through sixteen analog beams by using four radio frequency chains, four analog beams are distributed for four reference OFDM symbols in one-to-one correspondence. At this time, the analog beams are not doubly distributed to the plurality of reference OFDM symbols.

The transmitter matches the analog beams to respective subcarriers (i.e., resource elements) within each of the reference OFDM symbols, in step 1112. Namely, the transmitter allocates the distributed analog beams to the subcarriers of the corresponding reference OFDM symbol.

For example, the transmitter repeatedly allocates a predetermined number of analog beams uniquely distributed in correspondence to each of a predetermined number of reference OFDM symbols to subcarriers within the corresponding OFDM symbol. The subcarriers differentiate an entire frequency band within the corresponding OFDM symbol.

The example of allocating the distributed analog beams to the resource elements of the reference OFDM symbols has been fully described with reference to FIGS. 8 and 9.

The transmitter transmits reference signals through the analog beams allocated to the location of the respective subcarriers (i.e., the location of the respective resource elements) within the reference OFDM symbols, in step 1114.

Figure 12:
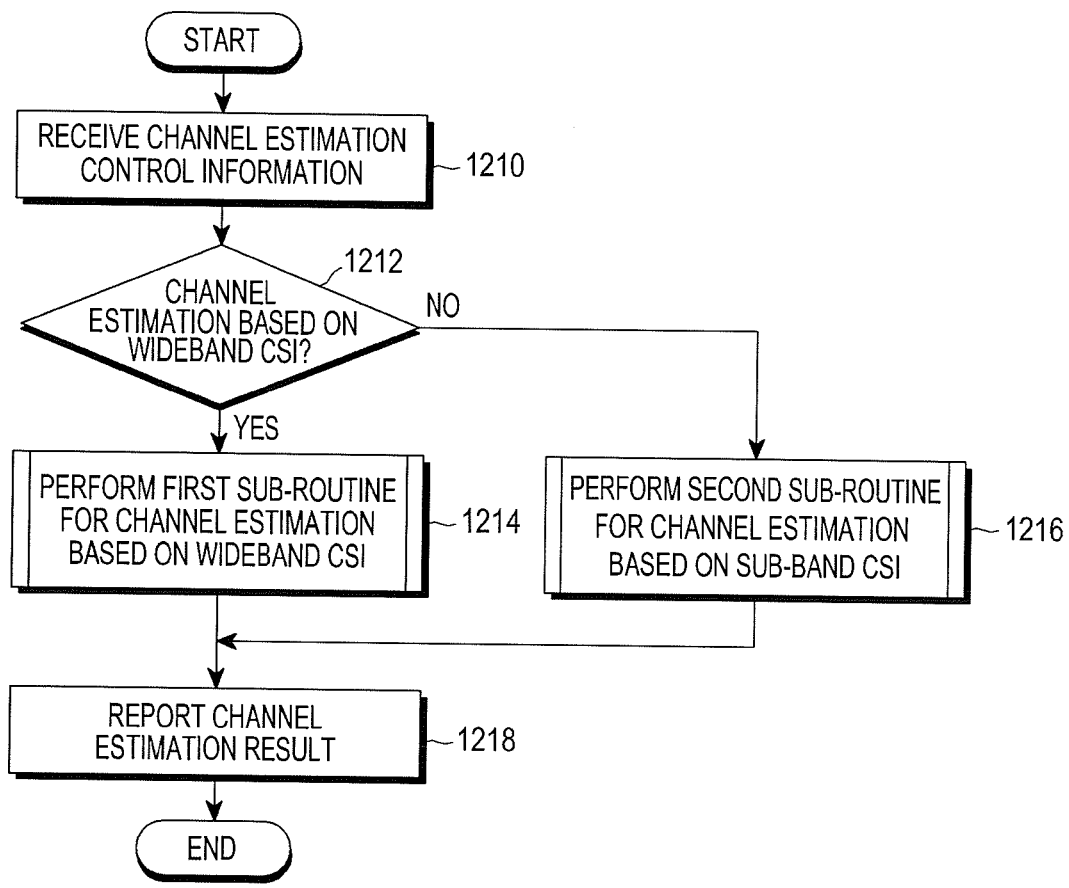
FIG. 12 is a flowchart illustrating a control flow for reporting channel qualities through channel measurement based on reference signals by a receiver according to an embodiment of the present disclosure.

FIG. 12 is a flowchart illustrating a control flow for reporting channel qualities through channel measurement based on reference signals by a receiver according to an embodiment of the present disclosure. Here, it is assumed that the receiver in an ultra-high frequency band based radio communication system receives reference signals for channel measurement through a predetermined number of OFDM symbols, measures channel states based on the reference signals, and reports the measurement result to a transmitter.

Referring to FIG. 12, the receiver receives a channel measurement instruction message from the transmitter through a control channel, in step 1210. The channel measurement instruction message includes channel measurement control information. The channel measurement control information may be configured by resource allocation identification information, transmission method identification information, and beam index bitmap information.

As an example, the receiver receives channel measurement control information b0, b1, b2, . . . , and bN+1 configured with N+2 bits from the transmitter through a Physical Downlink Control Channel (PDCCH).

Here, b0 is identification information for identifying wideband CSI and sub-band CSI. As an example, when b0 is 0, this means the wideband CSI, and when b0 is 1, this means the sub-band CSI.

b1 is identification information for differentiating a single beam transmission method and a multi-beam transmission method of transmitting reference signals by using selected analog beams. As an example, when b1 is 0, this means the single beam transmission method, and when b1 is 1, this means the multi-beam transmission method.

The remaining N bits b2, b3, b4, . . . , bN+1 are bitmaps representing indices for respective N analog beams. As an example, when b1 is 1, this means that a channel state is to be measured based on a reference signal transmitted by using an analog beam having an index i.

The receiver determines in step 1212 whether channel estimation based on the wideband CSI or channel measurement based on the sub-band CSI is requested. The receiver may determine the channel measurement method by the channel measurement control information included in the channel measurement instruction message. Namely, the resource allocation identification information b0 configuring the channel measurement control information enables the receiver to identify whether resources to transmit reference signals are allocated to be dispersed in an entire frequency band or are allocated in a specific frequency band.

If the resources to transmit the reference signals are allocated to be dispersed in the entire frequency band, the receiver determines to perform the channel estimation based on the wideband CSI. However, if the resources to transmit the reference signals are allocated in the specific frequency band, the receiver determines to perform the channel estimation based on the sub-band CSI.

When determining the channel estimation based on the wideband CSI, the receiver proceeds to step 1214 to perform a first sub-routine for the channel measurement based on the wideband CSI. On the other hand, when determining the channel measurement based on the sub-band CSI, the receiver proceeds to step 1216 to perform a second sub-routine for the channel measurement based on the sub-band CSI.

When the measurement for the channel states is completed by performing of the first or second sub-routine, the receiver reports the channel measurement results to the transmitter, in step 1218.

Figure 13:
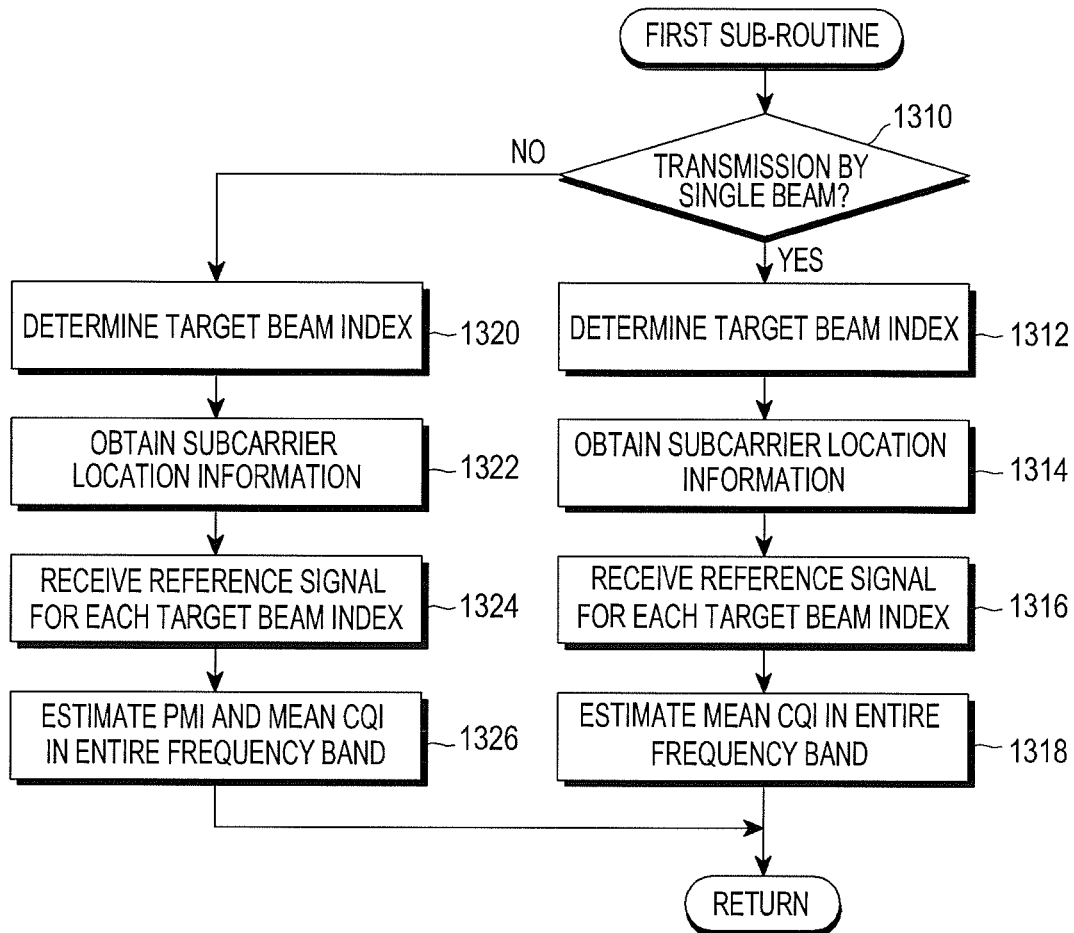
FIG. 13 is a flowchart illustrating a control flow corresponding to a first sub-routine for measuring wideband CSI by a receiver according to an embodiment of the present disclosure.

FIG. 13 is a flowchart illustrating a control flow corresponding to a first sub-routine for measuring wideband CSI by a receiver according to an embodiment of the present disclosure.

Referring to FIG. 13, the receiver determines in step 1310 whether a transmitter has transmitted reference signals by a single beam or multi-beams. The receiver may identify a beam type for transmitting the reference signals by channel measurement control information included in a channel measurement instruction message. Namely, transmission method identification information b1 configuring the channel measurement control information enables the receiver to identify whether the reference signals have been transmitted by a single beam or multi-beams.

If the reference signals have been transmitted by the single beam, the receiver performs channel state measurement by steps 1312 to 1318. However, if the reference signals have been transmitted by the multi-beams, the receiver performs channel state measurement by steps 1320 to 1326.

If the single beam has been used to transmit the reference signals, the receiver determines a target analog beam index, in step 1312. The target analog beam index is an index assigned for the analog beam through which the reference signal has been transmitted. For example, the receiver may identify the target analog beam index by bitmaps b2, b3, b4, . . . , bN+1 configured with N bits in the channel measurement control information. Namely, the respective N bits configuring the bitmaps b2, b3, b4, . . . , bN+1 correspond to analog beams transmitted by the transmitter in a one-to-one manner. As an example, the analog beam corresponding to a bit having a bit value of 1 in the bitmaps b2, b3, b4, . . . , bN+1 is determined as the target analog beam.

The receiver recognizes a location of a resource element (i.e., a subcarrier within a reference OFDM symbol) allocated in correspondence to an index of the obtained target analog beam, in step 1314. The location of the resource element allocated for the target analog beam in the reference OFDM symbol may be calculated by previously defined Equations 1 to 5. As an example, a location of a resource element in a reference OFDM symbol is defined by an index of time axis (an OFDM symbol index) and an index of a frequency axis (a subcarrier index).

The receiver receives a reference signal transmitted from the transmitter through the subcarrier at the location previously recognized through the obtained target analog beam, in step 1316.

The receiver measures a channel situation for the entire frequency band allocated for transmission of the reference signal, by using the received reference signal, and estimates a Pre-coding Matrix Index (PMI) and mean $CQI_i$ based on the measurement result, in step 1318.

As an example, the mean $CQI_i$ may be calculated by Equation 6, targeting the entire frequency band. The mean $CQI_i$ calculated by Equation 6 corresponds to an RSSI.

$$CQI_i = \frac{1}{K}\sum_{k=0}^{K-1} |\hat{h}(t_i, sub_i[k])|^2 \qquad \text{Equation 6}$$

Here, $\hat{h}$ denotes a channel state value estimated from a reference signal, $t_i$ denotes an OFDM symbol index, and $sub_i$ denotes a subcarrier index.

It has been assumed in the aforementioned embodiment that mean $CQI_i$ for an $n_i$ analog beam is to be estimated. As another example, the receiver may transfer, to the transmitter, $CQI_i$ values measured in correspondence to one or more target analog beams obtained by the bitmaps, or a $CQI_i$ value corresponding to the best wideband CSI among the $CQI_i$ values and an index of the corresponding analog beam.

If the multi-beams have been used to transmit the reference signals, the receiver determines a target analog beam index, in step 1320. The target analog beam index may be identified by bitmaps b2, b3, b4, . . . , bN+1 configured with N bits in the channel measurement control information.

The receiver recognizes a location of a resource element (i.e., a subcarrier within a reference OFDM symbol) allocated in correspondence to an index of the obtained target analog beam, in step 1322. The location of the resource element allocated for the target analog beam in the reference OFDM symbol may be calculated by previously defined Equations 1 to 5. As an example, a location of a resource element in a reference OFDM symbol is defined by an index of time axis (an OFDM symbol index) and an index of a frequency axis (a subcarrier index).

The receiver receives a reference signal transmitted from the transmitter through the subcarrier at the location previously recognized through the obtained target analog beam, in step 1324.

The receiver measures a channel situation by using the received reference signal, in step 1326. For example, since the target for which the channel situation is to be estimated corresponds to an entire frequency band, the receiver estimates CQI and PMI corresponding to the wideband by measuring the channel situations for the full frequency resources.

To this end, a channel vector $\check{h}_k$ estimated from the reference signals transmitted by using indices of the previously obtained analog beams is predicted by Equation 7.

$$\check{h}_k = \begin{bmatrix} \hat{h}(t_1, sub_1[k]) \\ \vdots \\ \hat{h}(t_{N_{RF,Tx}}, sub_{N_{RF,Tx}}[k]) \end{bmatrix} \quad \text{Equation 7}$$

The receiver searches for a code-book index having the highest correlation with the channel vector previously predicted over the full frequency resources and estimates the code-book index as PMI. For example, the PMI may be estimated by Equation 8.

$$PMI = \underset{j}{\operatorname{argmax}} \sum_{k=0}^{K-1} \left| \hat{h}_k^H p_i \right|^2 \quad \text{Equation 8}$$

After the PMI is determined by Equation 8, the receiver estimates mean CQI (CINR or RSSI) in the entire frequency band when performing pre-coding by the code-book corresponding to the determined PMI.

As an example, the mean CQIi may be calculated by Equation 9, targeting the entire frequency band. The mean CQI calculated by Equation 9 corresponds to an RSSI.

$$CQI = \frac{1}{K} \sum_{k=0}^{K-1} \left| \hat{h}_k^H p_{PMI} \right|^2 \quad \text{Equation 9}$$

The receiver feeds back, to the transmitter, the estimated CQI and PMI as channel measurement values.

Figure 14:
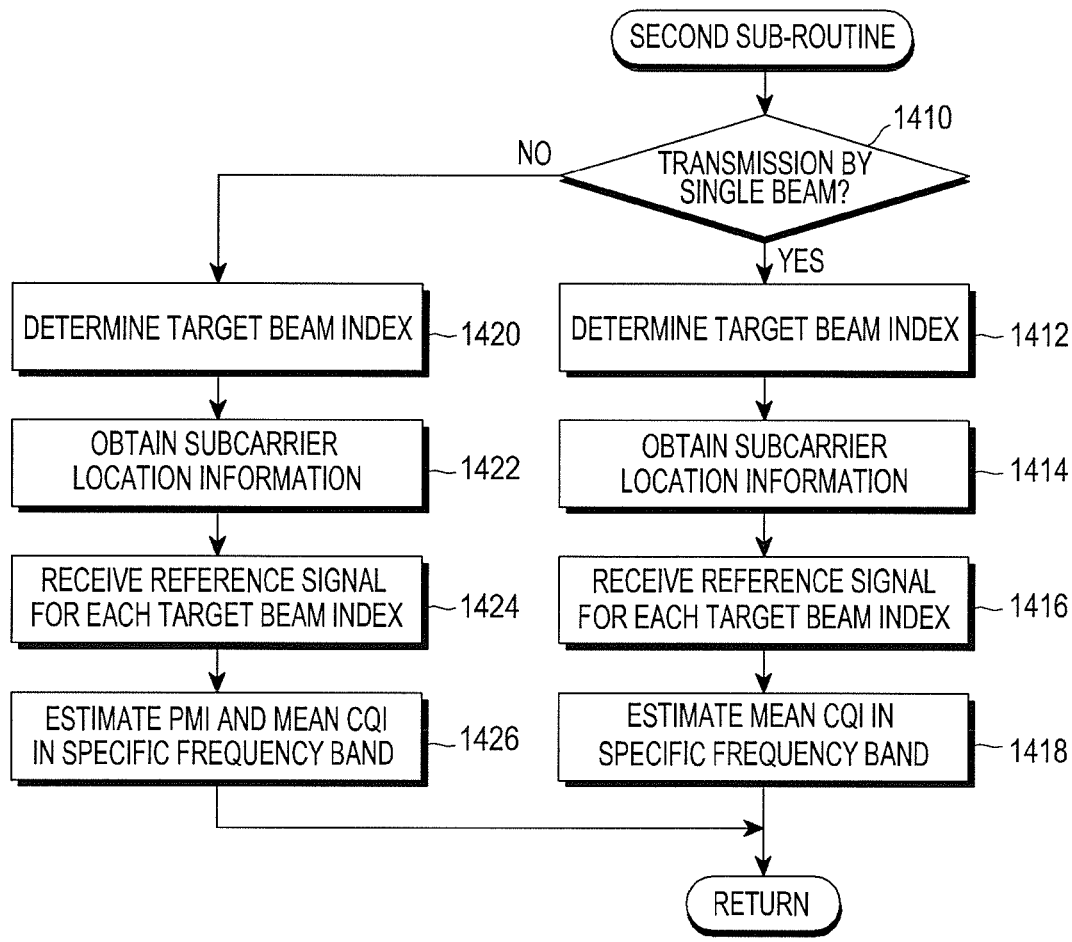
FIG. 14 is a flowchart illustrating a control flow corresponding to a second sub-routine for measuring sub-band CSI by a receiver according to an embodiment of the present disclosure.

FIG. 14 is a flowchart illustrating a control flow corresponding to a second sub-routine for measuring sub-band CSI by a receiver according to an embodiment of the present disclosure.

Referring to FIG. 14, the receiver determines in step 1410 whether a transmitter has transmitted reference signals by a single beam or multi-beams. The receiver may determine a beam type for transmitting the reference signals by channel measurement control infatuation included in a channel measurement instruction message. Namely, transmission method identification information b1 configuring the channel measurement control information enables the receiver to identify whether the reference signals have been transmitted by a single beam or multi-beams.

If the reference signals have been transmitted by the single beam, the receiver performs channel state measurement by steps 1412 to 1418. If the reference signals have been transmitted by the multi-beams, the receiver performs channel state measurement by steps 1420 to 1426.

If the single beam has been used to transmit the reference signals, the receiver determines a target analog beam index, in step 1412. The target analog beam index may be identified by bitmaps b2, b3, b4, . . . , bN+1 configured with N bits in the channel measurement control information.

The receiver recognizes a location of a resource element (i.e., a subcarrier within a reference OFDM symbol) allocated in correspondence to an index of the obtained target analog beam, in step 1414. The location of the resource element allocated for the target analog beam in the reference OFDM symbol may be calculated by previously defined Equations 1 to 5. As an example, a location of a resource element in a reference OFDM symbol is defined by an index of time axis (an OFDM symbol index) and an index of a frequency axis (a subcarrier index).

The receiver receives a reference signal transmitted from the transmitter through the subcarrier at the location previously recognized through the obtained target analog beam, in step 1416.

The receiver measures a channel situation for a specific frequency resource area where resources are allocated for transmission of the reference signal, namely, a $q^{th}$ sub-band area by using the received reference signal, and estimates mean CQIi[q] based on the measurement result, in step 1418.

As an example, the mean CQIi[q] may be calculated by Equation 10, targeting the specific frequency resource area, namely, the $q^{th}$ sub-band area. The mean CQIi[q] calculated by Equation 10 corresponds to an RSSI.

$$CQI_i[q] = \frac{1}{K_{sub}} \sum_{k=k_q}^{k_q+K_{sub}-1} \left| \hat{h}(t_i, sub_i[k]) \right|^2 \quad \text{Equation 10}$$

Here, $\check{h}$ denotes a channel state value measured from a reference signal, $t_i$ an OFDM symbol index, and $sub_i$ denotes a subcarrier index.

It has been assumed in the aforementioned embodiment that mean CQIi[q] for an analog beam is to be estimated. As another example, the receiver feeds CQIi[q] measured for all or some of the sub-bands back to the transmitter to transfer the channel measurement value instructed by transmitter. Here, when indices of one or more analog beams are transmitted through the bitmaps, the receiver calculates CQIi[q] of the corresponding sub-band for all the obtained analog beams. The receiver may transfer, to the transmitter, all the CQIi[q]s calculated for the respective analog beams, or the best CQIi[q] among the CQIi[q]s together with the index of the corresponding analog beam.

If the multi-beams have been used to transmit the reference signals, the receiver determines a target analog beam index, in step 1420. The target analog beam index may be identified by bitmaps b2, b3, b4, ..., bN+1 configured with N bits in the channel measurement control information.

The receiver recognizes a location of a resource element (i.e., a subcarrier within a reference OFDM symbol) allocated in correspondence to an index of the obtained target analog beam, in step 1422. The location of the resource element allocated for the target analog beam in the reference OFDM symbol may be calculated by previously defined Equations 1 to 5. As an example, a location of a resource element in a reference OFDM symbol is defined by an index of time axis (an OFDM symbol index) and an index of a frequency axis (a subcarrier index).

The receiver receives a reference signal transmitted from the transmitter at a location $(t_i, sub_i[k])$ of a subcarrier corresponding to an index $n_i$ of the obtained target analog beam, in step 1424.

Since the previously identified transmission method corresponds to sub-band CSI, the receiver measures a channel situation for a specific frequency resource area, namely, $q^{th}$ sub-band area by using the received reference signal, and estimates sub-band CQI and PMI based on the measurement result, in step 1426.

To this end, the receiver configures a vector $\tilde{h}_k$ for a channel characteristic by Equation 7 through the channel value estimated based on the reference signal transmitted by using the target analog beam.

The receiver searches for a code-book index having the highest correlation with the configured channel vector in the specific frequency resource, namely, $q^{th}$ sub-band area, and estimates the code-book index as PMI[q]. For example, the PMI may be estimated by Equation 11.

$$PMI[q] = \underset{j}{\operatorname{argmax}} \sum_{k=k_q}^{k_q+K_{sub}-1} |\tilde{h}_k^H p_i|^2 \quad \text{Equation 11}$$

After the PMI[q] is determined by Equation 11, the receiver estimates mean CQI[q] (CINR or RSSI) in the $q^{th}$ sub-band when performing pre-coding by the code-book corresponding to the determined PMI[q].

As an example, the mean CQI[q] may be calculated by Equation 12, targeting the $q^{th}$ sub-band. The mean CQI[q] calculated by Equation 12 corresponds to an RSSI.

$$CQI[q] = \frac{1}{K} \sum_{k=k_q}^{k_q+K_{sub}-1} |\tilde{h}_k^H p_{PMI[q]}|^2 \quad \text{Equation 12}$$

The receiver feeds back, to the transmitter, the CQI[q] and the PMI[q] estimated for all or some of the sub-bands as channel measurement values.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of transmitting reference signals by a base station in a communication system, the method comprising:
   determining locations of subcarriers for respective analog beams to transmit the reference signals within a predetermined number of orthogonal frequency division multiplexing (OFDM) symbols, based on indexes of a plurality of analog beams that are formable by an array antenna of the base station; and
   transmitting the reference signals on the determined locations of the subcarriers by using the analog beams corresponding to the determined locations of subcarriers,
   wherein locations of the subcarriers corresponding to at least two contiguous analog beams are determined to be adjacent to each other on a time axis or a frequency axis, and
   wherein a location of a subcarrier on which an analog beam among the plurality of analog beams is used to transmit a reference signal, is determined based on a number of radio frequency (RF) chains, a number of subcarriers to be usable to transmit the reference signals, an index of an OFDM symbol in which the analog beam is used to transmit the reference signal, and an index of the analog beam.

2. The method of claim 1, wherein determining the locations comprises:
   uniquely distributing a predetermined number of analog beams among the analog beams formed by the array antenna in correspondence to each of the predetermined number of OFDM symbols; and
   repeatedly determining the predetermined number of analog beams distributed for each of the predetermined number of OFDM symbols by targeting the subcarriers within a corresponding OFDM symbol.

3. The method of claim 1, further comprising:
   determining the at least two contiguous locations on the time axis or the frequency axis for determining at least two analog beams to simultaneously transmit the reference signals, based on feedback information from a user equipment (UE).

4. The method of claim 3, wherein a maximum number of analog beams capable of simultaneously transmitting the reference signals is determined such that a maximum beam width for transmission of the reference signals is obtained.

5. The method of claim 1, wherein determining the locations of subcarriers comprises:
   determining the index of the OFDM symbol in which the analog beam is used to transmit the reference signal, based on the index of the analog beam and the number of RF chains.

6. The method of claim 5, wherein the index of the OFDM symbol $(t_i[k])$ is determined by $$\left\lfloor \frac{n_i}{M} \right\rfloor$$

and the index of the subcarrier $(sub_i[k])$ is determined based on $M \times F \times k + \{M + (-1)^{t_i} \cdot (n_i \bmod M) - (t_i \bmod 2)\} \bmod M$ wherein k is $$0 \leq k < \frac{N_{sub}}{MF} = K,$$

$n_i$ is the index of the analog beam, M is the number of RF chains, $\lfloor . \rfloor$ is a round-down operation (a floor operation), F is a frequency reuse factor, and $N_{sub}$ is the number of all subcarriers.

7. The method of claim 5, wherein the index of the OFDM symbol $(t_i[k])$ is determined by $\{L + (-1)^{sub_i[k]} \cdot (n_i \bmod L) -$ (sub$_i$[k] mod 2)} mod L and the index of the subcarrier (sub$_i$[k]) is determined based on $$M \times F \times k + \left\lfloor \frac{n_i}{L} \right\rfloor,$$

wherein k is $$0 \leq k < \frac{N_{sub}}{MF} = K,$$

n$_i$ is the index of the analog beam, M is the number of RF chains, $\lfloor . \rfloor$ is a round-down operation (a floor operation), L is a number of OFDM symbols for reference signals, F is a frequency reuse factor, and N$_{sub}$ is the number of all subcarriers.

8. The method of claim 1, further comprising:
configuring a channel measurement instruction message to include resource allocation identification information, transmission method identification information, and beam index bitmap information; and
transmitting the configured channel measurement instruction message to a user equipment through a downlink control channel,
wherein the resource allocation identification information comprises information for designating one of a wideband transmission method by which resources for transmission of the reference signals are dispersed and allocated within an entire frequency band, and a sub-band transmission method by which resources for transmission of the reference signals are allocated within a specific frequency band, wherein the transmission method identification information comprises information for guiding whether the reference signals are transmitted using one analog beam or a plurality of analog beams based on a pre-coder, and wherein the beam index bitmap information comprises information for designating an analog beam for which channel measurement is to be performed.

9. A base station for transmitting reference signals in a communication system, the base station comprising:
a resource allocating unit configured to determine locations of subcarriers for respective analog beams to transmit the reference signals within a predetermined number of orthogonal frequency division multiplexing (OFDM) symbols, based on indexes of a plurality of analog beams that are formable by an array antenna of the base station; and
a transmission unit that transmit the reference signals using the analog beams corresponding to the subcarriers at at least two contiguous locations on a time axis or a frequency axis among the determined locations,
wherein locations of subcarriers corresponding to contiguous at least two analog beams are determined to be adjacent to each other on a time axis or a frequency axis, and
wherein a location of a subcarrier on which an analog beam among the plurality of analog beams is used to transmit a reference signal, is determined based on a number of radio frequency (RF) chains, a number of subcarriers to be usable to transmit the reference signals, an index of a OFDM symbol in which the analog beam is used to transmit the reference signal, and an index of the analog beam.

10. The base station of claim 9, wherein the resource allocating unit is configured to uniquely distribute a predetermined number of analog beams among the analog beams formed by the array antenna in correspondence to each of the predetermined number of OFDM symbols, and repeatedly determine the predetermined number of analog beams distributed for each of the predetermined number of OFDM symbols by targeting the subcarriers within a corresponding OFDM symbol.

11. The base station of claim 9, wherein the resource allocating unit is configured to determine the at least two contiguous locations on the time axis or the frequency axis for determining at least two analog beams to simultaneously transmit the reference signals based on feedback information from a user equipment.

12. The base station of claim 11, wherein the resource allocating unit is configured to determine a maximum number of analog beams capable of simultaneously transmitting the reference signals to obtain a maximum beam width for transmission of the reference signals.

13. The base station of claim 9, wherein the resource allocating unit is configured to determine the index of the OFDM symbol in which the analog beam is used to transmit the reference signal based on the index of the analog beam and the number of RF chains.

14. The base station of claim 13, wherein the resource allocating unit is configured to determine the index of the OFDM symbol (t$_i$[k]) by $$\left(\left\lfloor \frac{n_i}{M} \right\rfloor\right)$$

and the index of the subcarrier (sub$_i$[k]) based on M×F×k+ {M+(−1)$^{t_i}$·(n$_i$ mod M)−(t$_i$ mod 2)}mod M, wherein k is $$0 \leq k < \frac{N_{sub}}{MF} = K, n_i$$

is the index of the analog beam, M is the number of RF chains, $\lfloor . \rfloor$ is a round-down operation (a floor operation), F is a frequency reuse factor, and N$_{sub}$ is the number of subcarriers.

15. The base station of claim 13, wherein the resource allocating unit is configured to determine the index of the OFDM symbol (t$_i$[k]) by {L+(−1)$^{sub_i[k]}$·(n$_i$ mod L)−(sub$_i$[k] mod 2)}mod L and the index of the subcarrier sub$_i$[k] by $$M \times F \times k + \left\lfloor \frac{n_i}{L} \right\rfloor,$$

wherein k is $$0 \leq k < \frac{N_{sub}}{MF} = K,$$

n$_i$ is the index of the analog beam, M is the number of RF chains, $\lfloor . \rfloor$ is a round-down operation (a floor operation), L is a number of OFDM symbols for reference signals, F is a frequency reuse factor, and N$_{sub}$ is the number of subcarriers.

16. The base station of claim 9, wherein the transmission unit is configured to configure a channel measurement instruction message to include resource allocation identification information, transmission method identification information, and beam index bitmap information; and transmit the configured channel measurement instruction message to a user equipment through a downlink control channel,
wherein the resource allocation identification information comprises information for designating one of a wideband transmission method by which resources for transmission of the reference signals are dispersed and allocated within an entire frequency band, and a sub-band transmission method by which resources for transmission of the reference signals are allocated within a specific frequency band, wherein the transmission method identification information comprises information for guiding whether the reference signals are transmitted using one analog beam or a plurality of analog beams based on a pre-coder, and wherein the beam index bitmap information comprises information for designating an analog beam for which channel measurement is to be performed.

17. A method of receiving reference signals by a user equipment (UE) in a communication system, the method comprising:
receiving, from a base station, information on locations of subcarriers for a plurality of analog beams that are formable by an array antenna of the base station;
determining the locations of subcarriers for respective analog beams to transmit the reference signals within a predetermined number of orthogonal frequency division multiplexing (OFDM) symbols, based on indexes of the plurality of analog beams; and
receiving, from a base station, the reference signals on the determined locations of the subcarriers using the analog beams corresponding to the determined locations of subcarriers,
wherein locations of subcarriers corresponding to at least two contiguous analog beams are determined to be adjacent to each other on a time axis or a frequency axis, and
wherein a location of a subcarrier on which an analog beam among the plurality of analog beams is used to transmit a reference signal, is determined based on a number of radio frequency (RF) chains, a number of subcarriers to be usable to transmit the reference signals, an index of a OFDM symbol in which the analog beam is used to transmit the reference signal, and an index of the analog beam.

18. The method of claim 17, wherein determining the locations comprises:
uniquely distributing a predetermined number of analog beams among the analog beams formed by the array antenna in correspondence to each of the predetermined number of OFDM symbols; and
repeatedly allocating the predetermined number of analog beams distributed for each of the predetermined number of OFDM symbols by targeting the subcarriers within a corresponding OFDM symbol.

19. The method of claim 17, further comprising:
determining the at least two contiguous locations on the time axis or the frequency axis for determining at least two analog beams to simultaneously transmit the reference signals based on feedback information from a base station.

20. The method of claim 19, wherein a maximum number of analog beams capable of simultaneously transmitting the reference signals is determined such that a maximum beam width for transmission of the reference signals is obtained.

21. The method of claim 17, wherein determining the locations of subcarriers comprises:
determining the index of the OFDM symbol in which the analog beam is used to transmit the reference signal, based on the index of the analog beam and the number of RF chains.

22. The method of claim 21, wherein the index of the OFDM symbol ($t_i[k]$) is determined by $$\left\lfloor \frac{n_i}{M} \right\rfloor$$

and the index of the subcarrier ($sub_i[k]$) is determined based on $M \times F \times k + \{M + (-1)^{t_i} \cdot (n_i \bmod M) - (t_i \bmod 2)\} \bmod M$
wherein k is $$0 \le k < \frac{N_{sub}}{MF} = K,$$

$n_i$ is the index of the analog beam, M is the number of radio frequency chains, $\lfloor . \rfloor$ is a round-down operation (a floor operation), F is a frequency reuse factor, and $N_{sub}$ is the number of subcarriers.

23. The method of claim 21, wherein the index of the OFDM symbol ($t_i[k]$) is determined by $\{L + (-1)^{sub_i[k]} \cdot (n_i \bmod L) - (sub_i[k] \bmod 2)\} \bmod L$ and the index of the subcarrier ($sub_i[k]$) is determined based on $$M \times F \times k + \left\lfloor \frac{n_i}{L} \right\rfloor,$$

wherein k is $$0 \le k < \frac{N_{sub}}{MF} = K,$$

$n_i$ is the index of the analog beam, M is the number of radio frequency chains, $\lfloor . \rfloor$ is a round-down operation (a floor operation), L is a number of OFDM symbols for reference signals, F is a frequency reuse factor, and $N_{sub}$ is the number of subcarriers.

24. A user equipment (UE) for receiving reference signals in a communication system, the UE comprising:
a receiver configured to receive information on locations of subcarriers for a plurality of analog beams that are formable by an array antenna of a base station and to receive the reference signals on the determined locations of the subcarriers using the analog beams corresponding to the determined locations of subcarriers, and
a processor configured to determine the locations of subcarriers for respective analog beams to transmit the reference signals within a predetermined number of orthogonal frequency division multiplexing (OFDM) symbols, based on indexes of the plurality of analog beams,
wherein locations of subcarriers corresponding to at least two contiguous analog beams are determined to be adjacent to each other on a time axis or a frequency axis, and
wherein a location of a subcarrier on which an analog beam among the plurality of analog beams is used to transmit a reference signal, is determined based on a number of radio frequency (RF) chains, a number of subcarriers to be usable to transmit the reference signals, an index of a OFDM symbol in which the analog beam is used to transmit the reference signal, and an index of the analog beam.

25. The UE of claim 24,
wherein the processor configured to distribute uniquely a predetermined number of analog beams among the analog beams formed by the array antenna in correspondence to each of the predetermined number of OFDM symbols; and
to allocate repeatedly the predetermined number of analog beams distributed for each of the predetermined number of OFDM symbols by targeting the subcarriers within a corresponding OFDM symbol.

26. The UE of claim 24,
wherein the processor configured to determine the at least two contiguous locations on the time axis or the frequency axis for determining at least two analog beams to simultaneously transmit the reference signals based on feedback information from the base station.

27. The UE of claim 26, wherein a maximum number of analog beams capable of simultaneously transmitting the reference signals is determined such that a maximum beam width for transmission of the reference signals is obtained.

28. The UE of claim 24,
wherein the processor configured to determine the index of the OFDM symbol in which the analog beam is used to transmit the reference signal, based on the index of the analog beam and the number of RF chains.

29. The UE of claim 28, wherein the index of the OFDM symbol ($t_i[k]$) is determined by $$\left\lfloor \frac{n_i}{M} \right\rfloor$$

and the index of the subcarrier ($sub_i[k]$) is determined based on $M \times F \times k + \{M+(-1)^{t_i} \cdot (n_i \bmod M) - (t_i \bmod 2)\} \bmod M$
wherein k is $$0 \le k < \frac{N_{sub}}{MF} = K,$$

$n_i$ is the index of the analog beam, M is the number of RF chains, $\lfloor . \rfloor$ is a round-down operation (a floor operation), F is a frequency reuse factor, and $N_{sub}$ is the number of subcarriers.

30. The UE of claim 28, wherein the index of the OFDM symbol ($t_i[k]$) is determined by $\{L+(-1)^{sub_i[k]} \cdot (n_i \bmod L) - (sub_i[k] \bmod 2)\} \bmod L$ and the index of the subcarrier ($sub_i[k]$) is determined based on $$M \times F \times k + \left\lfloor \frac{n_i}{L} \right\rfloor,$$

wherein k is $$0 \le k < \frac{N_{sub}}{MF} = K, n_i$$

is the index of the analog beam, M is the number of RF chains, $\lfloor . \rfloor$ is a round-down operation (a floor operation), L is a number of OFDM symbols for reference signals, F is a frequency reuse factor, and $N_{sub}$ is the number of subcarriers.

* * * * *